United States Patent
Agiwal et al.

(10) Patent No.: US 11,696,340 B2
(45) Date of Patent: Jul. 4, 2023

(54) METHOD AND APPARATUS FOR HANDLING MSGA RETRANSMISSIONS DURING TWO STEP RANDOM ACCESS PROCEDURES IN WIRELESS COMMUNICATION SYSTEM

(71) Applicant: Samsung Electronics Co., Ltd., Gyeonggi-do (KR)

(72) Inventors: Anil Agiwal, Gyeonggi-do (KR); Jaehyuk Jang, Gyeonggi-do (KR); Soenghun Kim, Gyeonggi-do (KR); Mangesh Abhimanyu Ingale, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 17/579,823

(22) Filed: Jan. 20, 2022

(65) Prior Publication Data

US 2022/0150975 A1     May 12, 2022

Related U.S. Application Data

(63) Continuation of application No. 16/790,313, filed on Feb. 13, 2020, now Pat. No. 11,240,850.

(Continued)

(30) Foreign Application Priority Data

Mar. 12, 2019  (IN) .............................. 201931009602

(51) Int. Cl.
*H04W 74/08*  (2009.01)
*H04W 28/02*  (2009.01)
(Continued)

(52) U.S. Cl.
CPC ... *H04W 74/0833* (2013.01); *H04W 28/0278* (2013.01); *H04W 72/0446* (2013.01);
(Continued)

(58) Field of Classification Search
CPC ......... H04W 74/0833; H04W 28/0278; H04W 72/0446; H04W 72/23; H04W 74/004; H04W 74/006
See application file for complete search history.

(56) References Cited

U.S. PATENT DOCUMENTS

| | | | |
|---|---|---|---|
| 11,240,850 B2* | 2/2022 | Agiwal | H04W 72/23 |
| 2010/0202288 A1* | 8/2010 | Park | H04W 48/08 370/230 |

(Continued)

FOREIGN PATENT DOCUMENTS

| | | |
|---|---|---|
| KR | 10-1884353 | 8/2018 |
| WO | WO 2017/0222327 | 12/2017 |

(Continued)

OTHER PUBLICATIONS

U.S. Appl. No. 62/754,589, filed Nov. 2018, Chen.
(Continued)

*Primary Examiner* — Jael M Ulysse
(74) *Attorney, Agent, or Firm* — The Farrell Law Firm, P.C.

(57) ABSTRACT

The disclosure relates to a communication method and system for converging a 5th-Generation (5G) communication system for supporting higher data rates beyond a 4th-Generation (4G) system with a technology for the Internet of things (IoT). The present disclosure may be applied to intelligent services based on 5G communication technology and IoT-related technology, such as smart home, smart building, smart city, smart car, connected car, health care, digital education, smart retail, security and safety services. The present disclosure provides a method and apparatus for handling message A retransmission during 2 step random access procedures.

20 Claims, 21 Drawing Sheets

Related U.S. Application Data

(60) Provisional application No. 62/805,058, filed on Feb. 13, 2019.

(51) Int. Cl.
*H04W 72/0446* (2023.01)
*H04W 74/00* (2009.01)
*H04W 72/23* (2023.01)

(52) U.S. Cl.
CPC ......... *H04W 72/23* (2023.01); *H04W 74/004* (2013.01); *H04W 74/006* (2013.01)

(56) References Cited

U.S. PATENT DOCUMENTS

| | | |
|---|---|---|
| 2011/0222498 A1 | 9/2011 | Chun |
| 2014/0355539 A1 | 12/2014 | Yang et al. |
| 2017/0019930 A1 | 1/2017 | Lee |
| 2017/0034854 A1 | 2/2017 | Park |
| 2018/0103465 A1 | 4/2018 | Agiwal et al. |
| 2018/0110074 A1 | 4/2018 | Akkarakaran |
| 2018/0242367 A1 | 8/2018 | Kim |
| 2018/0279375 A1 | 9/2018 | Jeon |
| 2018/0279376 A1 | 9/2018 | Dinan |
| 2019/0037605 A1 | 1/2019 | Agiwal et al. |
| 2019/0124715 A1 | 4/2019 | Chen |
| 2019/0159258 A1 | 5/2019 | Islam |
| 2019/0174466 A1* | 6/2019 | Zhang ..................... H04L 5/005 |
| 2019/0223157 A1 | 7/2019 | Hwang et al. |
| 2019/0254114 A1 | 8/2019 | Son |
| 2019/0289544 A1 | 9/2019 | Yi |
| 2019/0297537 A1* | 9/2019 | Tsai ..................... H04W 72/23 |
| 2019/0297547 A1* | 9/2019 | Tsai ..................... H04W 72/23 |
| 2019/0306848 A1 | 10/2019 | Zhou |
| 2019/0357238 A1* | 11/2019 | Zhou ................. H04W 72/0453 |
| 2019/0357272 A1 | 11/2019 | Lim |
| 2020/0100299 A1 | 3/2020 | Loehr |
| 2020/0106573 A1* | 4/2020 | Cirik ................. H04W 74/0833 |
| 2020/0107322 A1 | 4/2020 | Lunttila |
| 2020/0107371 A1 | 4/2020 | Kunt |
| 2020/0112886 A1* | 4/2020 | John Wilson ......... H04W 36/08 |
| 2020/0146069 A1 | 5/2020 | Chen |
| 2020/0229238 A1 | 7/2020 | Zhang |
| 2020/0245371 A1 | 7/2020 | Chande |
| 2020/0252973 A1 | 8/2020 | Zhang |
| 2020/0260485 A1 | 8/2020 | Lei |
| 2020/0344651 A1* | 10/2020 | Yang .................. H04W 36/0016 |
| 2021/0377825 A1* | 12/2021 | Deenoo ................. H04W 48/12 |
| 2022/0015131 A1* | 1/2022 | Cheng .................. H04W 74/04 |
| 2022/0053385 A1* | 2/2022 | Li ..................... H04W 36/0069 |

FOREIGN PATENT DOCUMENTS

| | | | |
|---|---|---|---|
| WO | WO-2018026401 A1 * | 2/2018 | ........... H04W 36/00 |
| WO | WO 2018/129394 | 7/2018 | |

OTHER PUBLICATIONS

U.S. Appl. No. 62/791,628, filed Jan. 2019, Zhang.
ZTE Corporation, Sanechips, "MSG2 Payload Contents for 2-Step RACH", R2-1817064, 3GPPP TSG-RAN WG2 Meeting #104, Nov. 12-16, 2018, 9 pages.
International Search Report dated May 19, 2020 issued in counterpart application No. PCT/KR2020/001794, 7 pages.
Vivo, "RAN2 Impacts of 2-Step RACH", R2-1818260, 3GPP TSG-RAN WG2 Meeting #104, Nov. 12-16, 2018, 5 pages.
Asustek, "Consideration on Fallback of 2-step RACH Procedure", R2-1700358, 3GPP TSG-RAN WG2 Meeting #NR Ad Hoc, Jan. 17-19, 2017, 4 pages.
European Search Report dated Dec. 10, 2021 issued in counterpart application No. 20755828.9-1215, 6 pages.
Huawei et al., "Timers and Counters for Two-Steps RACH", R2-1816604, 3GPP TSG-RAN WG2 Meeting #104, Nov. 12-16, 2018, 2 pages.
European Search Report dated Jan. 16, 2023 issued in counterpart application No. 20755828.9-1215, 7 pages.
Interdigital, "2-Step RACH Procedure", R2-1814008, 3GPP TSG-RAN WG2 Meeting # 103bis, Oct. 8-12, 2018, 5 pages.
3GPP Ts 36.523-1 V15.3.0, 3GPP, Evolved Universal Terrestrial Radio Access (E-UTRA); User Equipment (UE) Conformance Specification; Radio Transmission and Reception; Part1: Conformance Testing (Release 15), Sep. 2018, 868 pages.
Korean Office Action dated Apr. 18, 2023 issued in counterpart application No. 10-2021-7017258, 10 pages.

* cited by examiner

METHOD AND APPARATUS FOR HANDLING MSGA RETRANSMISSIONS DURING TWO STEP RANDOM ACCESS PROCEDURES IN WIRELESS COMMUNICATION SYSTEM

CROSS-REFERENCE TO RELATED APPLICATION(S)

This application is continuation of U.S. Ser. No. 16/790,313, which was filed in the United States Patent and Trademark Office (USPTO) on Feb. 13, 2020, and is based on and claims priority under 35 U.S.C. § 119(e) to U.S. Provisional Patent Application Ser. No. 62/805,058, which was filed in the USPTO on Feb. 13, 2019, and under 35 U.S.C. § 119 to Indian Provisional Patent Application Serial No. 201931009602, which was filed in the Indian Patent Office on Mar. 12, 2019, the entire disclosure of each of which is incorporated herein by reference.

BACKGROUND

1. Field of the Disclosure

The disclosure relates generally to a wireless communication system and, more particularly, to an apparatus, a method, and a system for handling message A (MSG A) retransmissions during a two-step random access procedure in a wireless communication system.

2. Related Art

To meet the demand for wireless data traffic having increased since deployment of fourth generation (4G) communication systems, efforts have been made to develop an improved fifth generation (5G) or pre-5G communication system. Therefore, a 5G or a pre-5G communication system is also referred to as a beyond 4G network or a post long term evolution (LTE) system. A 5G communication system is considered to be implemented in higher frequency (mm-Wave) bands, e.g., 60 GHz bands, in order to accomplish higher data rates. To decrease propagation loss of radio waves and increase transmission distance, beamforming, massive multiple-input multiple-output (MIMO), full dimensional MIMO (FD-MIMO), an array antenna, analog beam forming, and large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, a moving network, cooperative communication, coordinated multi-points (CoMP), reception-end interference cancellation and the like. In a 5G system, hybrid frequency shift keying (FSK) and quadrature amplitude modulation (QAM) modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where people generate and consume information, is now evolving to the Internet of Things (IoT) where distributed entities, such as things, exchange and process information without human intervention. The Internet of Everything (IoE), which is a combination of IoT technology and big data processing technology through connection with a cloud server, has emerged. As technology elements, such as sensing technology, wired/wireless communication and network infrastructure, service interface technology, and security technology have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. The IoT may be applied to a variety of fields including smart home, smart building, smart city, smart car, connected cars, smart grid, health care, smart appliances and advanced medical services through convergence and combination between existing information technology (IT) and various industrial applications.

Accordingly, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered an example of convergence between 5G technology and IoT technology.

Recently, there is a need to enhance a two-step random access procedure in next generation wireless communication system.

SUMMARY

An aspect of the disclosure provides a communication method and system for converging a 5G communication system for supporting higher data rates beyond a 4G communication system.

In accordance with an aspect of the disclosure, a method performed by a terminal in a wireless communication system is provided. The method includes receiving a radio resource control (RRC) message including first information configuring a random access channel less (RACH-less) handover for a target cell and second information on one or more transmission configuration indicator (TCI) states for the target cell; and receiving, from a base station, upon the RACH-less handover, a physical downlink control channel (PDCCH) on the target cell based on a first TCI state among the one or more TCI states. A demodulation reference signal (DMRS) antenna port associated with the PDCCH is quasi co-located with a synchronization signal block (SSB) or a channel state information reference signal (CSI-RS) corresponding to the first TCI state.

In accordance with another aspect of the disclosure, a method of a base station in a wireless communication system is provided. The method includes transmitting, to a terminal, upon a random access channel less (RACH-less) handover, a physical downlink control channel (PDCCH) based on a first transmission configuration indicator (TCI) state among one or more TCI states. A demodulation reference signal (DMRS) antenna port associated with the PDCCH is quasi co-located with a synchronization signal block (SSB) or a channel state information reference signal (CSI-RS) corresponding to the first TCI state, and a transmission of the PDCCH is based on a radio resource control (RRC) message including first information configuring the RACH-less handover for a target cell and second information on the one or more TCI states for the target cell.

In accordance with another aspect of the disclosure, a terminal is provided. The terminal includes a transceiver; and a controller configured to receive, via the transceiver, a radio resource control (RRC) message including first information configuring a random access channel less (RACH-less) handover for a target cell and second information on one or more transmission configuration indicator (TCI) states for the target cell, and receive, from a base station, via the transceiver, upon the RACH-less handover, a physical downlink control channel (PDCCH) on the target cell based on a first TCI state among the one or more TCI states. A demodulation reference signal (DMRS) antenna port associated with the PDCCH is quasi co-located with a synchronization signal block (SSB) or a channel state information reference signal (CSI-RS) corresponding to the first TCI state.

In accordance with another aspect of the disclosure, a base station is provided. The base station includes a transceiver; and a controller configured to transmit, to a terminal, via the transceiver, upon a random access channel less (RACH-less) handover, a physical downlink control channel (PDCCH) based on a first transmission configuration indicator (TCI) state among one or more TCI states. A demodulation reference signal (DMRS) antenna port associated with the PDCCH is quasi co-located with a synchronization signal block (SSB) or a channel state information reference signal (CSI-RS) corresponding to the first TCI state. A transmission of the PDCCH is based on a radio resource control (RRC) message including first information configuring the RACH-less handover for a target cell and second information on the one or more TCI states for the target cell.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
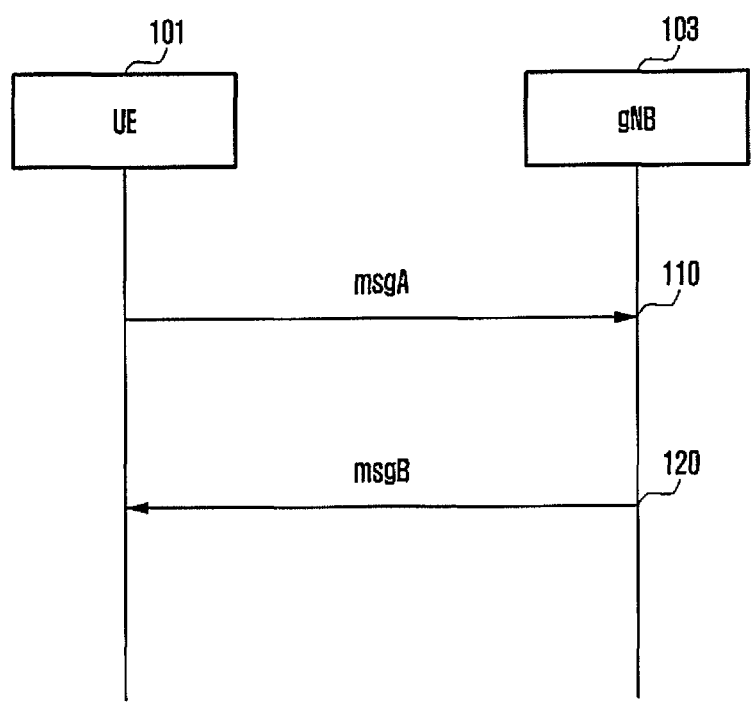
FIG. 1 is a flow-diagram of a two-step random access procedure.

The following description with reference to the accompanying drawings is provided to assist in a comprehensive understanding of the disclosure as defined by the appended claims and their equivalents. includes various specific details to assist in that understanding but these are intended to be regarded as merely exemplary. Accordingly, those of ordinary skill in the art will recognize that various changes and modifications of the disclosure described herein may be made without departing from the scope and spirit of the disclosure. In addition, descriptions of well-known functions and constructions are omitted for clarity and conciseness.

The words used in the following description and claims are not intended to be limited to their dictional meanings, but are merely used to facilitate understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "substantially" indicates that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Blocks of a flowchart (or a sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a non-transitory computer readable memory that is usable in a specialized computer or programmable data processing equipment, it is also possible to create articles of manufacture that carry out functions described in the flowchart. Because the computer program instructions may be loaded on a computer or programmable data processing equipment, when executed as processes, the computer program instructions may carry out operations of functions described in the flowchart.

A block of a flowchart may correspond to a module, a segment, or code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In the disclosure, the words "unit", "module" and the like may refer to a software component or a hardware component, such as, for example, a field-programmable gate array (FPGA) or an application-specific integrated circuit (ASIC) capable of carrying out a function or an operation. However, a unit, or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Terms or definitions necessary to understand the disclosure are described below. These terms are intended to be construed in a non-limiting way.

A base station (BS) is an entity communicating with a user equipment (UE) and may be referred to as a BS, a base transceiver station (BTS), a node B (NB), an evolved NB (eNB), an access point (AP), a 5G NB (5GNB), or a gNB.

A UE is an entity communicating with a BS and may be referred to as a UE, a device, a mobile station (MS), a mobile equipment (ME), or a terminal.

In recent years several broadband wireless technologies have been developed to meet the growing number of broadband subscribers and to provide more and better applications and services. The $2^{nd}$ generation wireless communication system has been developed to provide voice services while ensuring the mobility of users. The $3^{rd}$ generation wireless communication system supports not only voice service but also data service. In recent years, the 4G wireless communication system has been developed to provide high-speed data service. However, currently, the 4G wireless communication system suffers from a lack of resources to meet the growing demand for high speed data services. So, the 5G wireless communication system is being developed to meet the growing demand for high speed data services, support ultra-reliability and low latency applications.

The 5G wireless communication system will be implemented not only in lower frequency bands but also in higher frequency (e.g., mmWave) bands, e.g., 10 GHz to 100 GHz bands, so as to accomplish higher data rates. To mitigate propagation loss of radio waves and increase transmission distance, beamforming, MIMO, FD-MIMO, array antenna, analog beam forming, and large scale antenna techniques are being considered in the design of a 5G wireless communication system. In addition, the 5G wireless communication system is expected to address different use cases having quite different requirements in terms of data rate, latency, reliability, mobility etc. However, it is expected that the design of the air-interface of the 5G wireless communication system would be flexible enough to serve UEs having quite different capabilities depending on the use case and market segment of the end customer to which the UE provides service. A few example use cases the 5G wireless communication system wireless system is expected to address is enhanced Mobile Broadband (eMBB), massive MTC (m-MTC), ultra-reliable low latency communication (URLLC), etc. eMBB requirements such as tens of Gbps data rate, low latency, high mobility and so on address a market segment representing conventional wireless broadband subscribers needing Internet connectivity everywhere, all the time and on the go. m-MTC requirements such as very high connection density, infrequent data transmission, very long battery life, low mobility address and so on address a market segment representing the IoT/IoE envisioning connectivity of billions of devices. URLLC requirements such as very low latency, very high reliability and variable mobility and so on address a market segment representing an industrial automation application, and vehicle-to-vehicle/vehicle-to-infrastructure communication foreseen as one of the enablers for autonomous cars.

In a 5G wireless communication system operating in higher frequency (mmWave) bands, a UE and a gNB communicate with each other using beamforming. Beamforming techniques are used to mitigate propagation path losses and increase propagation distance for communication at a higher frequency band. Beamforming enhances transmission and reception performance using a high-gain antenna. Beamforming may be classified into transmission (TX) beamforming performed in a transmitting end and reception (RX) beamforming performed in a receiving end.

In general, TX beamforming increases directivity by allowing an area, in which a signal propagates, to be densely located in a specific direction by using a plurality of antennas. In this case, aggregation of a plurality of antennas may be referred to as an antenna array, where each antenna included in the antenna array may be referred to as an array element. The antenna array may be configured in various forms such as a linear array, a planar array, etc. The use of TX beamforming results in an increase in directivity of a signal, thereby increasing propagation distance. Further, since a signal may not be transmitted in a direction other than a directivity direction, signal interference acting on another receiving end is significantly reduced. The receiving end may perform beamforming on a RX signal by using an RX antenna array. RX beamforming increases RX signal strength transmitted in a specific direction by allowing propagation to be concentrated in a specific direction, and excludes a signal transmitted in a direction other than the specific direction from the RX signal, thereby providing an effect of blocking an interference signal.

By using beamforming, a transmitter may generate a plurality of transmit beam patterns of different directions. Each of these transmit beam patterns may be referred to as a TX beam. A wireless communication system operating at a high frequency uses a plurality of narrow TX beams to transmit signals in a cell as each narrow TX beam provides coverage to a part of the cell. The narrower the TX beam, the higher the antenna gain and, therefore, the larger the propagation distance of a signal transmitted using beamforming. A receiver may generate a plurality of RX beam patterns of different directions. Each of these receive patterns may be referred to as an RX beam.

A 5G wireless communication system supports a standalone mode of operation as well dual connectivity (DC). In DC a multiple Rx/Tx UE may be configured to utilize resources provided by two different nodes (or NBs) connected via non-ideal backhaul. One node acts as a master node (MN) and the other node acts as a secondary node (SN). The MN and SN are connected via a network interface and at least the MN is connected to the core network. New radio (NR) supports a multi-radio access technology (RAT) dual connectivity (MR-DC) operation whereby a UE in a radio resource control connected state (or RRC_CONNECTED) is configured to utilize radio resources provided by two distinct schedulers, located in two different nodes connected via a non-ideal backhaul and providing either evolved universal mobile telecommunications system (UMTS) terrestrial radio access (E-UTRA) (e.g., if the node is an ng-eNB) or NR access (e.g., if the node is a gNB). In NR, for a UE in RRC_CONNECTED, not configured with carrier aggregation (CA)/DC, there is only one serving cell including the primary cell (PCell). For a UE in RRC_CONNECTED configured with CA/DC the term "serving cells" is used to denote a set of cells including a special cell(s) and all secondary cells (SCells). In NR, the term master cell group (MCG) refers to a group of serving cells associated with a master node, including the PCell and optionally one or more SCells. In NR, the term secondary cell group (SCG) refers to a group of serving cells associated with a secondary node, including the PSCell and optionally one or more SCells. In NR, PCell refers to a serving cell in MCG, operating on a primary frequency, in which the UE either performs an initial connection establishment procedure or initiates a connection re-establishment procedure. In NR, for a UE configured with CA, an Scell is a cell providing additional radio resources on top of a special cell. Primary SCG cell (PSCell) refers to a serving cell in SCG in which a UE performs random access when performing a reconfiguration with synchronization (sync) procedure. For a DC operation the term SpCell (e.g., special cell) refers to a PCell of an MCG or a PSCell of an SCG, otherwise the term special cell refers to the PCell.

In a 5G wireless communication system, a node B (gNB) or a base station in a cell broadcast synchronization signal and physical broadcast channel (PBCH) block consists of a primary synchronization signal (PSS) and a secondary synchronization signal (SSS) and system information. System information includes common parameters needed to communicate in cell. In a 5G wireless communication system (also referred as next generation radio or NR), system information (SI) is divided into a master information block (MIB) and a number of system information blocks (STBs) where:

the MIB is always transmitted on the PBCH with a periodicity of 80 ms, repetitions are made within 80 ms, and the MIB includes parameters that are needed to acquire an SIB1 from a cell;

the SIB1 is transmitted on a downlink shared channel (DL-SCH) with a periodicity of 160 ms and variable transmission repetition. The default transmission repetition periodicity of the SIB1 is 20 ms but the actual transmission repetition periodicity is up to network implementation. SIB1 includes information regarding an availability and scheduling (e.g. mapping of SIBs to an SI message, periodicity, SI-window size) of other SIBs with an indication whether one or more SIBs are only provided on-demand and, in that case, the configuration needed by the UE to perform the SI request. SIB1 is a cell-specific SIB; and SIBs other than SIB1 are carried in system information (SI) messages, which are transmitted on the DL-SCH. Only STBs having the same periodicity may be mapped to the same SI message.

In a 5G wireless communication system, a physical downlink control channel (PDCCH) is used to schedule downlink (DL) transmissions on a physical downlink shared channel (PDSCH) and schedule uplink (UL) transmissions on a PUSCH, where downlink control information (DCI) on the PDCCH includes downlink assignments containing at least a modulation and coding format, a resource allocation, and hybrid automatic repeat request (HARQ) information related to DL-SCH; uplink scheduling grants containing at least a modulation and coding format, resource allocation, and hybrid-ARQ information related to UL-SCH. In addition to scheduling, PDCCH may be used for activation and deactivation of a configured PUSCH transmission with a configured grant; activation and deactivation of a PDSCH semi-persistent transmission; notifying one or more UEs of a slot format; notifying one or more UEs of a physical resource block(s) (PRB(s)) and orthogonal frequency division multiplexing (OFDM) symbol(s) where the UE may assume no transmission is intended for the UE; transmission of transmission power control (TPC) commands for physical uplink control channel (PUCCH) and PUSCH; transmission of one or more TPC commands for sounding reference signal (SRS) transmissions by one or more UEs; and switching a UE's active bandwidth part; initiating a random access procedure. A UE monitors a set of PDCCH candidates in configured monitoring occasions in one or more configured control resource sets (CORESETs) according to corresponding search space configurations. A CORESET consists of a set of PRBs with a time duration of 1 to 3 OFDM symbols. A resource unit's resource element groups (REGs) and control channel elements (CCEs) are defined within a CORESET with each CCE consisting of a set of REGs. Control channels are formed by aggregation of CCEs. Different code rates for control channels are realized by aggregating a different number of CCEs. Interleaved and non-interleaved CCE-to-REG mapping are supported in a CORESET. Polar coding is used for PDCCH. Each resource element group carrying PDCCH carries the resource element group's own demodulation reference signal (DMRS). Quadrature phase shift keying (QPSK) modulation is used for PDCCH.

In a 5G wireless communication system, a list of search space configurations are signaled by a gNB for each configured bandwidth part (BWP) wherein each search configuration is uniquely identified by an identifier. An identifier of a search space configuration to be used for a specific purpose such as paging reception, SI reception, and random access response reception is explicitly signaled by the gNB. An NR search space configuration includes parameters monitoring-periodicity-PDCCH-slot, monitoring-offset-PDCCH-slot, monitoring-symbols-PDCCH-within-slot and duration. A UE determines PDCCH monitoring occasion(s) within a slot using the parameters PDCCH monitoring periodicity (monitoring-periodicity-PDCCH-slot), the PDCCH monitoring offset (monitoring-offset-PDCCH-slot), and the PDCCH monitoring pattern (monitoring-symbols-PDCCH-within-slot). PDCCH monitoring occasions are in slots x to x+duration where the slot with number x in a radio frame with number y satisfies Equation (1) below:

$$(y*(\text{number of slots in a radio frame})+x-\text{monitoring-offset-PDCCH-slot}) \bmod (\text{monitoring-periodicity-PDCCH-slot})=0 \qquad (1)$$

The starting symbol of a PDCCH monitoring occasion in each slot having a PDCCH monitoring occasion is given by monitoring-symbols-PDCCH-within-slot. The length (in symbols) of a PDCCH monitoring occasion is given in the CORESET associated with the search space. A search space configuration includes an identifier of a CORESET configuration associated with the search space. A list of CORESET configurations are signaled by a gNB for each configured BWP wherein each CORESET configuration is uniquely identified by an identifier. Each radio frame has a 10 ms duration. A radio frame is identified by a radio frame number or a system frame number. Each radio frame includes several slots wherein the number of slots in a radio frame and a duration of slots depends on a sub carrier spacing. The number of slots in a radio frame and a duration of slots depends on a radio frame for each supported SCS and is pre-defined in NR. Each CORESET configuration is associated with a list of transmission configuration indicator (TCI) states. One DL RS ID (SSB or CSI RS) is configured per TCI state. The list of TCI states corresponding to a CORESET configuration is signaled by a gNB via RRC signaling. One of the TCI states in a TCI state list is activated and indicated to a UE by a gNB. A TCI state indicates the DL TX beam (DL TX beam is quasi-collocated (QCLed) with SSB/CSI RS of TCI state) used by a gNB for transmission of PDCCH in the PDCCH monitoring occasions of a search space.

In a 5G wireless communication system, bandwidth adaptation (BA) is supported. With BA, a receive and transmit bandwidth of a UE need not be as large as the bandwidth of a cell and may be adjusted: the width may be ordered to change (e.g. to shrink during a period of low activity to save power); a location may move in the frequency domain (e.g. to increase scheduling flexibility); and a subcarrier spacing may be ordered to change (e.g. to allow different services).

A subset of a total cell bandwidth of a cell is referred to as a BWP. BA is achieved by configuring an RRC connected UE with BWP(s) and informing the UE which of the configured BWPs is currently an active one. When a BA is configured, a UE only has to monitor a PDCCH on the one active BWP, i.e., the UE does not have to monitor a PDCCH on the entire DL frequency of the serving cell. In an RRC connected state, a UE is configured with one or more DL and UL BWPs, for each configured serving cell (i.e., PCell or SCell). For an activated serving cell, there is always one active UL and DL BWP at any point in time. The BWP switching for a serving is used to activate an inactive BWP and deactivate an active BWP. The BWP switching is controlled by a PDCCH indicating a downlink assignment or an uplink grant, by the bwp-InactivityTimer, by the RRC signaling, or by a medium access control (MAC) entity upon initiation of a random access procedure. Upon addition of an SpCell or activation of an SCell, the DL BWP and UL BWP indicated by firstActiveDownlinkBWP-Id and firstActiveUplinkBWP-Id, respectively, is active without receiving a PDCCH indicating a downlink assignment or an uplink grant. The active BWP for a serving cell is indicated by either an RRC or a PDCCH. For an unpaired spectrum, a DL BWP is paired with a UL BWP, and BWP switching is common for both UL and DL. Upon expiration of a BWP inactivity timer, a UE switches to the active DL BWP to the default DL BWP or an initial DL BWP (if a default DL BWP is not configured).

In 5G wireless communication system (also referred to as NR), a random access (RA) procedure is used to achieve uplink time synchronization. A RA procedure is used during initial access, handover, an RRC connection re-establishment procedure, scheduling request transmission, SCG addition/modification and data or control information transmission in an uplink by a non-synchronized UE in an RRC CONNECTED state.

During a contention based random access (CBRA) procedure (including four steps), a UE first transmits a random access preamble (also referred to as Msg1) and then waits for a random access response (RAR) or Msg2 in an RAR window corresponding to its random access preamble transmission. A gNB transmits an RAR on a PDSCH addressed to a random access radio network temporary identifier (RA-RNTI).

A RA-RNTI identifies a time-frequency resource (also referred as a physical random access channel (PRACH) occasion or PRACH TX occasion or RACH occasion) in which a random access preamble was detected by a gNB. The maximum size of an RAR-window is one radio frame, i.e., 10 ms. The RA-RNTI is calculated as follows in Equation (2):

$$\text{RA-RNTI} = 1 + s\_id + 14 * t\_id + 14 * 80 * f\_id + 14 * 80 * 8 * ul\_carrier\_id \quad (2)$$

In Equation (2) above, s_id is an index of a first OFDM symbol of a PRACH occasion where a UE has transmitted Msg1, i.e., RA preamble; $0 \leq s\_id < 14$, t_id is an index of a first slot of a PRACH occasion ($0 \leq t\_id < 80$), f_id is an index of a PRACH occasion within a slot in a frequency domain ($0 \leq f\_id < 8$), and ul_carrier_id is a UL carrier used for Msg1 transmission (0 for NUL (normal uplink carrier) and 1 for SUL (supplementary carrier).

Several RARs for various random access preambles detected by a gNB may be multiplexed in a same RAR MAC protocol data unit (PDU) by the gNB. An RAR in a MAC PDU corresponds to a UE's random access preamble transmission if it includes random access preamble identifier (RAPID) of a random access preamble transmitted by the UE. If the RAR corresponding to its random access preamble transmission is not received during the RAR window and the UE has not yet transmitted the random access preamble for a configurable (configured by the gNB in a RACH configuration) number of times, the UE retransmits the random access preamble. If the RAR corresponding to its random access preamble transmission is received and the UE has transmitted a dedicated random access preamble, the RA procedure is considered successful.

If the UE has transmitted a non-dedicated (i.e., contention based) random access preamble then upon successful reception of an RAR, the UE transmits Msg3 in a UL grant received in the RAR. The UE generates a new MAC PDU using the data available in logical channels. Msg3 includes a message such as an RRC connection request, RRC connection re-establishment request, an RRC handover confirmation, a scheduling request, etc. The Msg3 also includes the UE identity (i.e., a cell RNTI (C-RNTI) or serving temporary subscriber identity (S-TMSI) or a random number). After transmitting the Msg3, the UE starts a contention resolution timer. While the contention resolution timer is running, if the UE receives a PDCCH addressed to a C-RNTI included in the Msg3, contention resolution is considered successful, the contention resolution timer is stopped and the RA procedure is completed. While the contention resolution timer is running, if the UE receives a contention resolution MAC CE including the UE's contention resolution identity (first X bits of common control channel (CCCH) service data unit (SDU) transmitted in the Msg3), contention resolution is considered successful, the contention resolution timer is stopped and the RA procedure is completed. If the contention resolution timer expires and the UE has not yet transmitted the random access preamble for a configurable number of times, the UE retransmits the random access preamble.

In a 5G wireless communication system, a contention free random access (CFRA) procedure is also supported. CFRA is used for scenarios such as handover where low latency is required, timing advance establishment for an Scell, etc. An ENB or a gNB assigns to a UE non-contention RA preamble in dedicated signaling. The UE transmits the assigned non-contention RA preamble. The ENB or the gNB transmits the RAR on the PDSCH addressed to an RA-RNTI. The RAR conveys an RA preamble identifier and timing alignment information. The RAR may also include a UL grant. The RAR is transmitted in a RAR window similar to a contention based RA procedure. A contention free RA procedure terminates after receiving the RAR.

In order to reduce the latency of a four-step CBRA procedure, a two-step RACH procedure is being studied. The two step RACH refers to a procedure which can complete a CBRA in two steps.

FIG. 1 is a flow-diagram of a two-step random access procedure.

Referring to FIG. 1, in step 110, UE 101 transmits a random access preamble on a PRACH and a payload (i.e., a MAC PDU) on a PUSCH. The random access preamble and the payload transmission is also referred as a MsgA. In the second step 120, after the MsgA transmission, the UE 101 monitors for a response from the network 103 (i.e., a gNB). The response is also referred as a MsgB. The MsgB is addressed to MSGB-RNTI, where MSGB-RNTI is defined as follows in Equation (3).

$$\text{MSGB-RNTI}=1+s\_id+14*t\_id+14*80*f\_id+ \\ 14*80*8*ul\_carrier\_id+14*80*8*2 \qquad (3)$$

In the Equation (3) above, s_id is an index of a first OFDM symbol of a PRACH occasion where the UE 101 has transmitted a PRACH preamble; 0≤s_id<14, t_id is an index of a first slot of a PRACH occasion (0≤t_id<80), f_id is an index of a PRACH occasion within a slot in a frequency domain (0≤f_id<8), and ul_carrier_id is a UL carrier used for Msg1 transmission (0 for a normal uplink (NUL) carrier and 1 for a supplementary uplink (SUL) carrier.

If a CCCH SDU was transmitted in the MsgA payload, the UE 101 performs contention resolution using the contention resolution information in the MsgB. The contention resolution is successful if the contention resolution identity received in the MsgB matches the first 48 bits of the CCCH SDU transmitted in the MsgA. If the C-RNTI was transmitted in the MsgA payload, the contention resolution is successful if the UE 101 receives the PDCCH addressed to the C-RNTI. If contention resolution is successful, the random access procedure is considered successfully completed. Instead of contention resolution information corresponding to the transmitted MsgA, the MsgB may include a fallback information corresponding to the random access preamble transmitted in the MsgA. If the fallback information is received, the UE 101 transmits an Msg3 and performs contention resolution using an Msg4 as in a CBRA procedure. If contention resolution is successful, the random access procedure is considered successfully completed. If contention resolution fails upon fallback (i.e., upon transmitting the Msg3), the UE 101 goes back to the first step 110 for MsgA transmission, i.e., the UE 101 transmits a random access preamble on a PRACH and a payload (i.e., the MAC PDU) on the PUSCH. If the window in which the UE 101 monitors for a network response after transmitting the MsgA expires and the UE 101 has not received the MsgB including contention resolution information or fallback information as described above, the UE 101 goes back to the first step 110 and transmits the MsgA. If the random access procedure is not successfully completed even after transmitting the MsgA a configurable number of times, the UE 101 fallbacks to a four step RACH procedure wherein the UE 103 only transmits the PRACH preamble (i.e., the Msg1).

The MsgA payload may include one or more of a CCCH SDU, a dedicated control channel (DCCH) SDU, a dedicated traffic channel (DTCH) SDU, a buffer status report (BSR) MAC control element (CE), a power headroom report (PHR) a MAC CE, synchronization signal block (SSB) information, a C-RNTI MAC CE, or padding. The MsgA may include a UE identifier (ID) (e.g. a random ID, an S-TMSI, a C-RNTI, a resume ID, etc.) along with a preamble in the first step 110. The UE ID may be included in the MAC PDU of the MsgA. The UE ID such as a C-RNTI may be carried in a MAC CE wherein the MAC CE is included in the MAC PDU. Other UE IDs (such as a random ID, an S-TMSI, a C-RNTI, a resume ID, etc.) may be carried in a CCCH SDU. The UE ID may be one of a random ID, an S-TMSI, a C-RNTI, a resume ID, an IMSI, an idle mode ID, an inactive mode ID, etc. The UE ID may be different in different scenarios in which the UE 101 performs the RA procedure.

When the UE 101 performs an RA after power on (before the UE 101 is attached to the network 103), then the UE ID is the random ID. When the UE 101 performs an RA in an idle state after the UE 101 is attached to the network 103, the UE ID is an S-TMSI. If the UE 101 has an assigned C-RNTI (e.g. the UE 101 is in a connected state), the UE ID is a C-RNTI. In case the UE 101 is in an inactive state, the UE ID is a resume ID. In addition to the UE ID, some additional control information may be sent in the MsgA. The control information may be included in the MAC PDU of the MsgA. The control information may include one or more of a connection request indication, a connection resume request indication, an SI request indication, a buffer status indication, beam information (e.g. one or more DL TX beam ID(s) or SSB ID(s)), beam failure recovery indication/information, a data indicator, a cell/BS/TRP (transmission and reception point) switching indication, a connection re-establishment indication, a reconfiguration complete or a handover complete message, etc.

Figure 2:
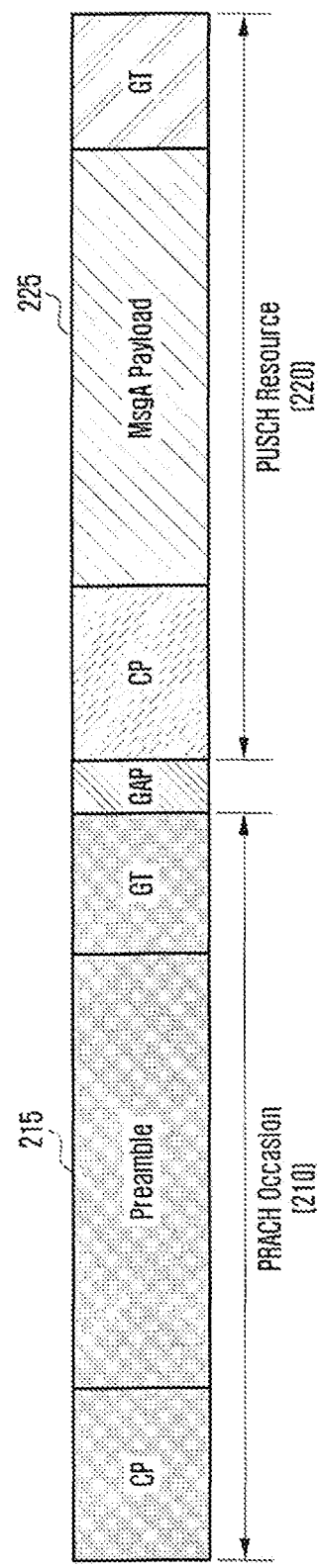
FIG. 2 is an illustration of a structure of a MSG A in two-step random access procedure according to an embodiment.

FIG. 2 is an illustration of a structure of a message A (or MsgA) in a two-step random access procedure according to an embodiment.

Referring to FIG. 2, in two-step CFRA, a gNB assigns to a UE a dedicated random access preamble (s) and a PUSCH resource(s) for MsgA transmission. RACH occasion(s) (or, RO(s)) to be used for preamble transmission may also be indicated. The UE transmits a random access preamble 215 on a PRACH occasion 210 and a payload 225 on a PUSCH resource 220 using the contention free random access resources (i.e., a dedicated preamble/PUSCH resource/RO). After MsgA transmission, the UE monitors for a response from the network (i.e., the gNB) within a configured window.

2 Step CF RACH: MsQA Payload Handling Upon RA Procedure Completion

Figure 3:
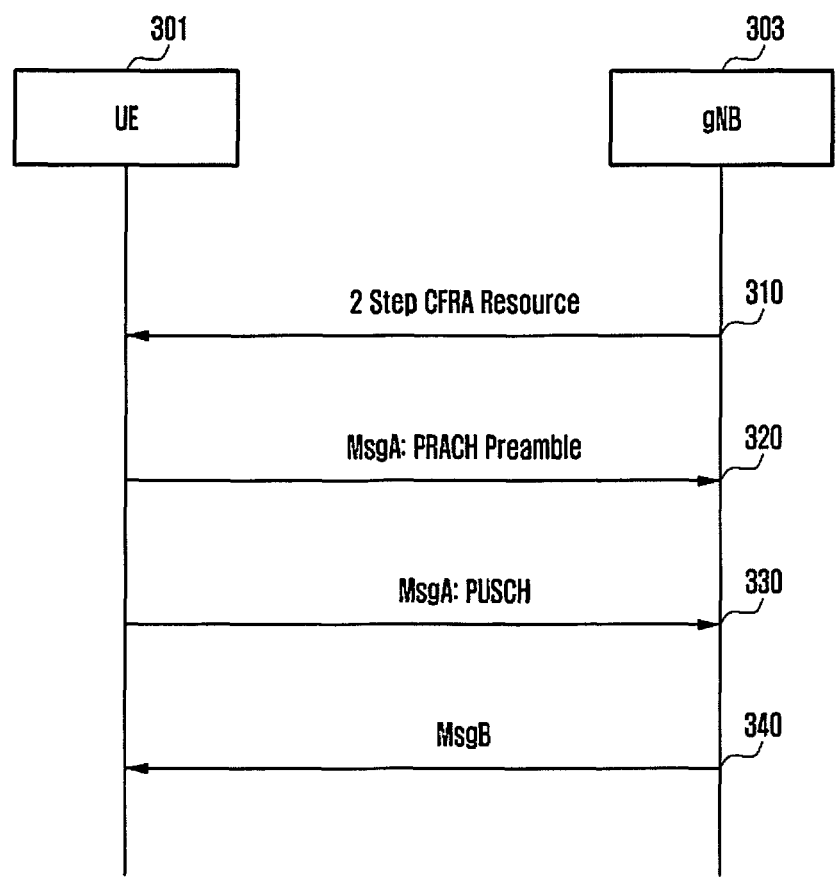
FIG. 3 is a flow-diagram of a two-step random access procedure according to an embodiment.
Figure 4:
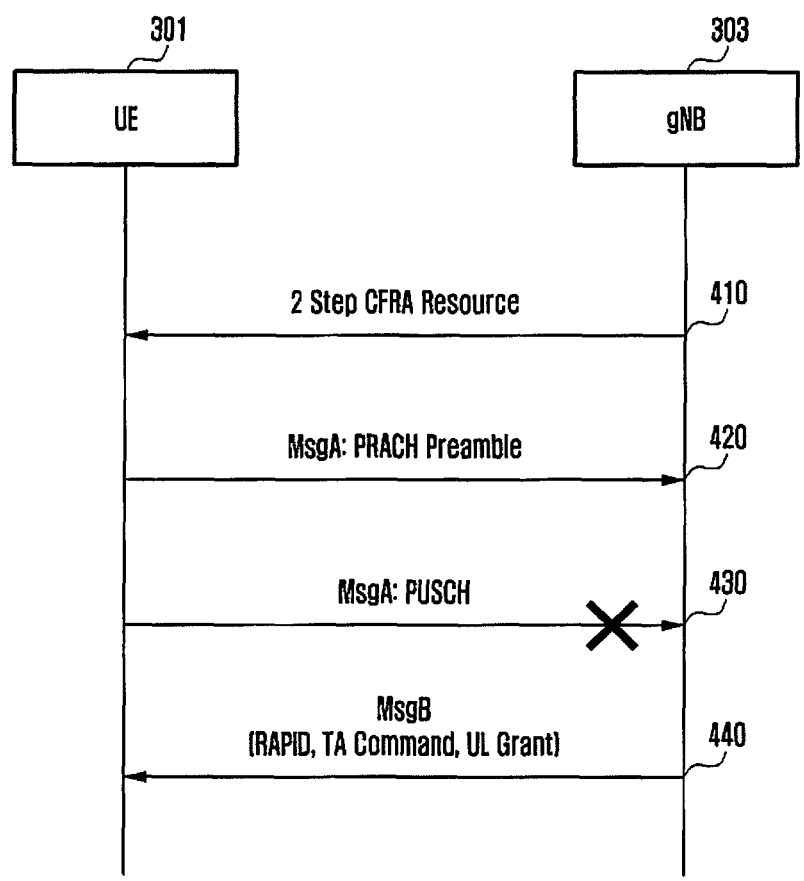
FIG. 4 is a flow-diagram of a two-step random access procedure according to an embodiment.

FIG. 3 and FIG. 4 are flow-diagrams of a two-step random access procedure according to embodiments.

Referring to FIGS. 3 and 4, in a case of two step CF RACH, a gNB 303 signals contention free random access resources (i.e., dedicated preamble(s)/RACH occasion(s)

and PUSCH resource(s)) to a UE 301 in steps 310 and 410. The UE 301 transmits a PRACH preamble in a PRACH occasion and a msgA payload (or a msgA MAC PDU) in a PUSCH resource/occasion using the assigned contention free random access resources in steps 320, 330, 420, and 430, respectively.

If the gNB 303 receives the msgA (i.e., both the PRACH preamble and the msgA payload), the gNB 303 transmits a msgB including a RAPID, a TA and a UL grant in step 340. If the RAPID in the received msgB matches the RAPID of the PRACH preamble transmitted by the UE 301, the random access procedure is completed. This procedure is shown in FIG. 3. Alternately, if the gNB 303 receives the msgA (i.e., both the PRACH preamble and the msgA payload), the gNB 303 transmits a PDCCH addressed to a C-RNTI. Contention free random access is performed in an RRC connected state where the UE 301 has an assigned C-RNTI. The gNB 303 can identify the UE 301 based on the received PRACH preamble and, therefore, can transmit the PDCCH addressed to the C-RNTI. If the UE 301 receives the PDCCH addressed to the C-RNTI, the random access procedure is completed. Upon completion of the random access procedure, buffers and/or HARQ buffers used for the MsgA are discarded.

If the gNB 303 receives only the PRACH preamble, the gNB 303 transmits the msgB including a RAPID, a TA and a UL grant in step 440. If the RAPID in the received msgB matches the RAPID of the PRACH preamble transmitted by the UE 301, the random access procedure is completed. This is shown in FIG. 4. Alternately, if the gNB 303 receives the msgA (i.e., both the PRACH preamble and the msgA payload), the gNB 303 transmits a PDCCH addressed to a C-RNTI. Contention free random access is performed in an RRC connected state where the UE 301 has an assigned C-RNTI. The gNB 303 may identify the UE 301 based on the received PRACH preamble and, therefore, may also transmit the PDCCH addressed to the C-RNTI. If the UE 301 receives the PDCCH addressed to the C-RNTI, the random access procedure is completed. Upon completion of the random access procedure, buffers and/or HARQ buffers used for the MsgA are discarded.

In this procedure, the msgA payload is lost if the msgA payload is not received by the gNB 303. In order to avoid msgA payload loss, the UE 301 may store the msgA payload. Upon completion of the random access procedure, the UE 301 may retransmit the msgA payload or discard the msgA payload based on information received in the msgB corresponding to the transmitted msgA. In the disclosure, several methods are provided to enable the UE 301 to identify whether to retransmit the msgA payload or discard the msgA payload upon completion of the two step CF RACH procedure.

Figure 5A:
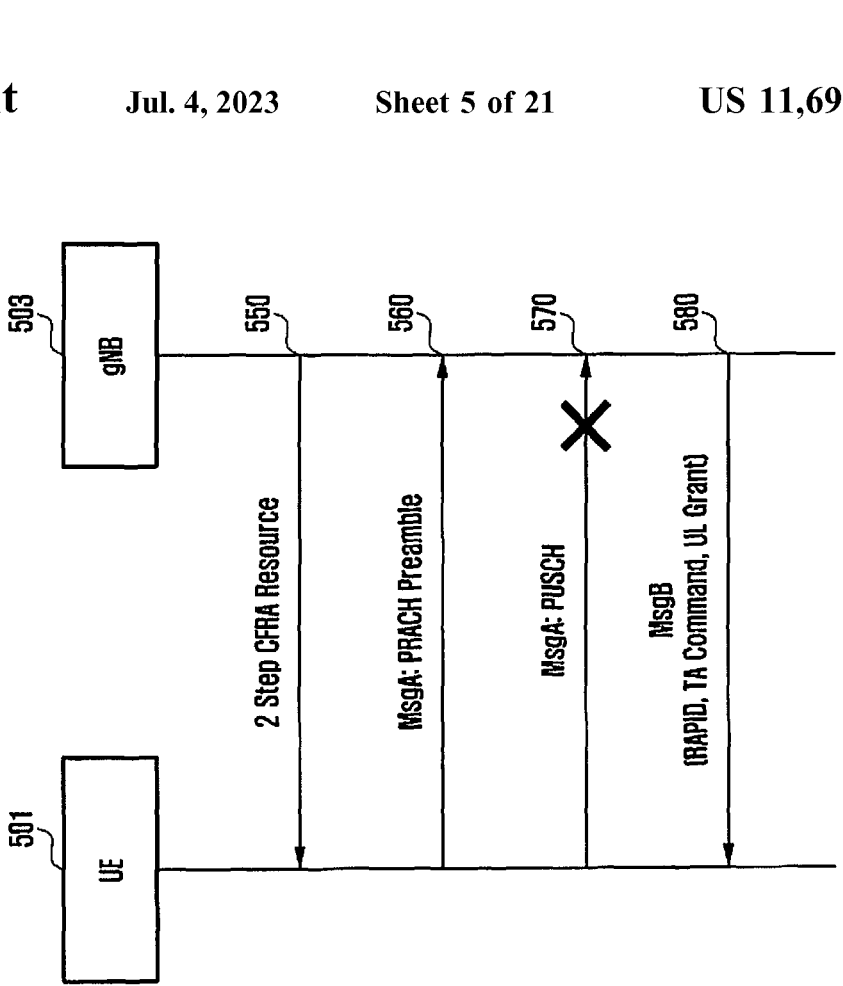
FIGS. 5A and 5B are flow-diagrams of a two-step random access procedure according to an embodiment.
Figure 5B:
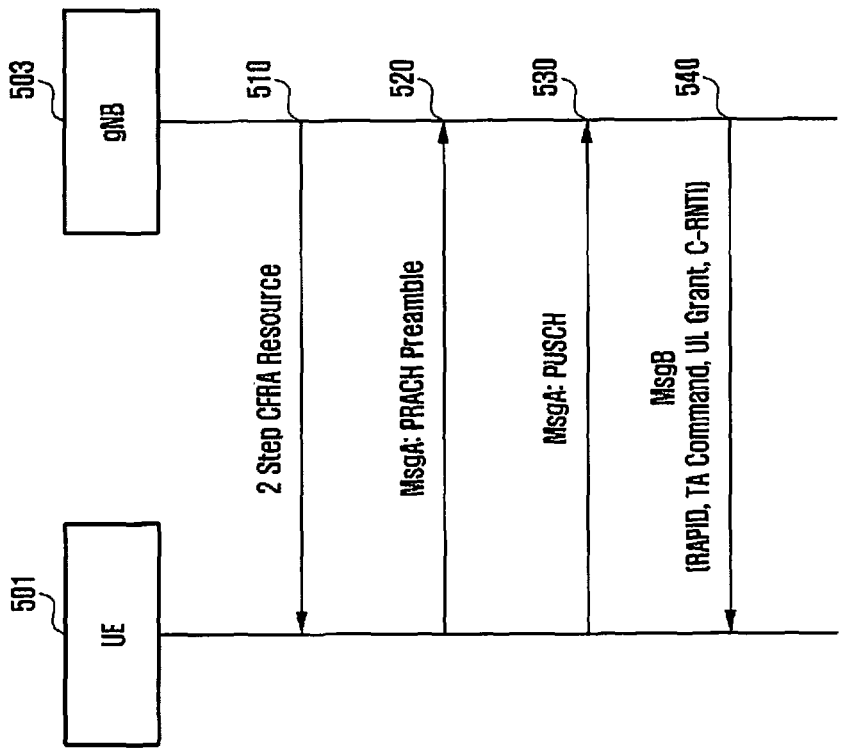

FIGS. 5A and 5B are flow-diagrams of a two-step random access procedure according to an embodiment.

Referring to FIGS. 5A and 5B, in a case of two step CF RACH, a gNB 503 signals contention free random access resources (i.e., dedicated preambles/RACH occasions and PUSCH resources) to a UE 501 in steps 510 and 550, respectively. The UE 501 transmits a PRACH preamble in a PRACH occasion and an msgA payload (or an msgA MAC PDU) in a PUSCH resource/occasion using the assigned contention free random access resources in steps 520, 530, 560, and 570, respectively. The UE 501 stores the msgA payload (i.e., the msgA MAC PDU) in an msgA buffer. For msgA payload transmission, a HARQ entity in the UE 501 perform a new HARQ packet transmission wherein HARQ packet for transmission is generated using the msgA payload in the msgA buffer. The UE 501 maintains a number of parallel HARQ processes. Each HARQ process supports one transport block (TB). Each HARQ process is associated with a HARQ process identifier. For UL transmission for the msgA payload, a HARQ process identifier 0 is used.

After transmitting the msgA, the UE 501 starts msgB-ResponseWindow and monitors the PDCCH for random access response (i.e., an msgB) in msgB-ResponseWindow. The UE 501 monitors a PDCCH of an SpCell for a random access response identified by an MSGB-RNTI while the msgB-ResponseWindow is running. If a C-RNTI MAC CE was included in the msgA payload, the UE 501 additionally monitors the PDCCH of the SpCell for a random access response identified by the C-RNTI while the msgB-ResponseWindow is running.

If the gNB 503 receives the msgA (i.e., both the PRACH preamble and the msgA payload) successfully, the gNB 503 includes the C-RNTI of the UE 501 (which transmitted the msgA) in the msgB as shown in FIG. 5A in step 540. The gNB 503 may identify the UE 501 from the received PRACH preamble. The PRACH preamble is received in a contention free random access resource assigned to the UE 501. However, if the gNB 503 only receives the PRACH preamble but fails to receive the msgA payload, the gNB 503 does not include the C-RNTI in the msgB as shown in FIG. 5B in step 580. The msgB includes a RAPID corresponding to the PRACH preamble irrespective of whether the gNB 503 receives the msgA payload or not.

If the msgA is transmitted using the contention free random access resource and if the msgB received by the UE 501 includes the RAPID corresponding to the PRACH preamble transmitted by the UE 501, then the UE 501 considers that the msgB is successfully received and the random access procedure is successfully completed.

If the msgB includes a C-RNTI, the UE 501 discards the msgA payload, i.e., the UE 501 discards the msgA buffer and an HARQ buffer used for msgA payload transmission.

If the msgB does not include the C-RNTI, the UE 501 retransmits the msgA payload (i.e., an msgA MAC PDU) in the UL grant received in the msgB. For msgA payload transmission in the UL grant received in the msgB, an HARQ entity in the UE 501 performs a new HARQ packet transmission wherein a HARQ packet for transmission is generated using the msgA payload in the msgA buffer. For UL transmission for the msgA payload, an HARQ process identifier 0 is used. Upon transmitting the msgA payload in the UL grant received in the msgB, if the UE 501 receives a PDCCH addressed to C-RNTI for an HARQ process zero with new data indicator (NDI) not toggled, the UE 501 performs HARQ retransmission. If the msgB does not include the C-RNTI and the UL grant is not received in the msgB, the UE 501 retransmits the msgA payload in a subsequent UL grant using an HARQ process zero upon receiving a PDCCH addressed to a C-RNTI for an HARQ process zero with an NDI not toggled wherein the UE 501 performs an HARQ retransmission.

Figure 6A:
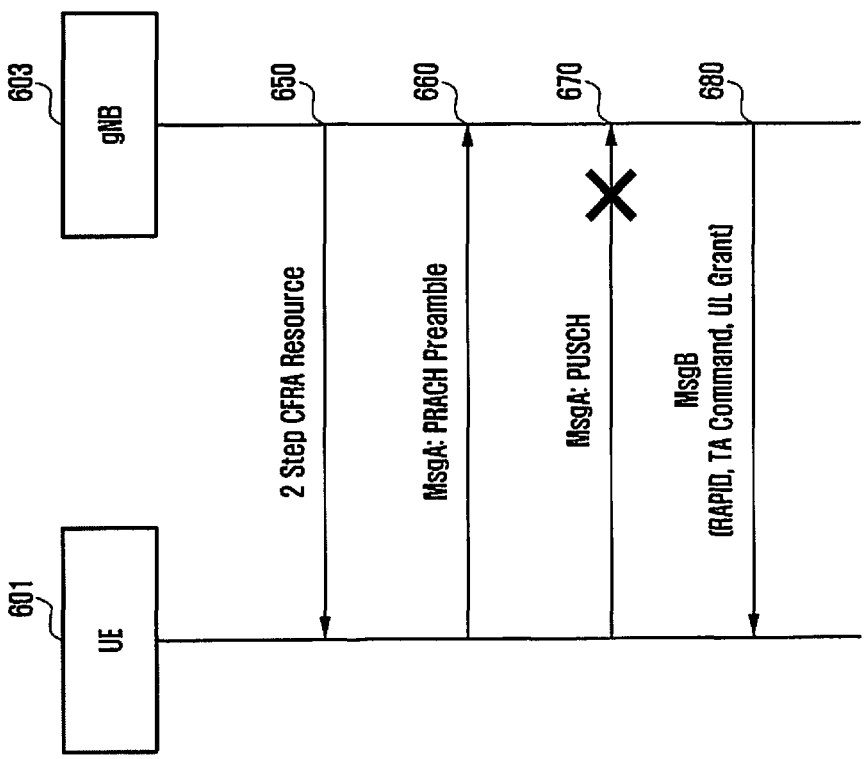
FIGS. 6A and 6B are flow-diagrams of a two-step random access procedure according to an embodiment.
Figure 6B:
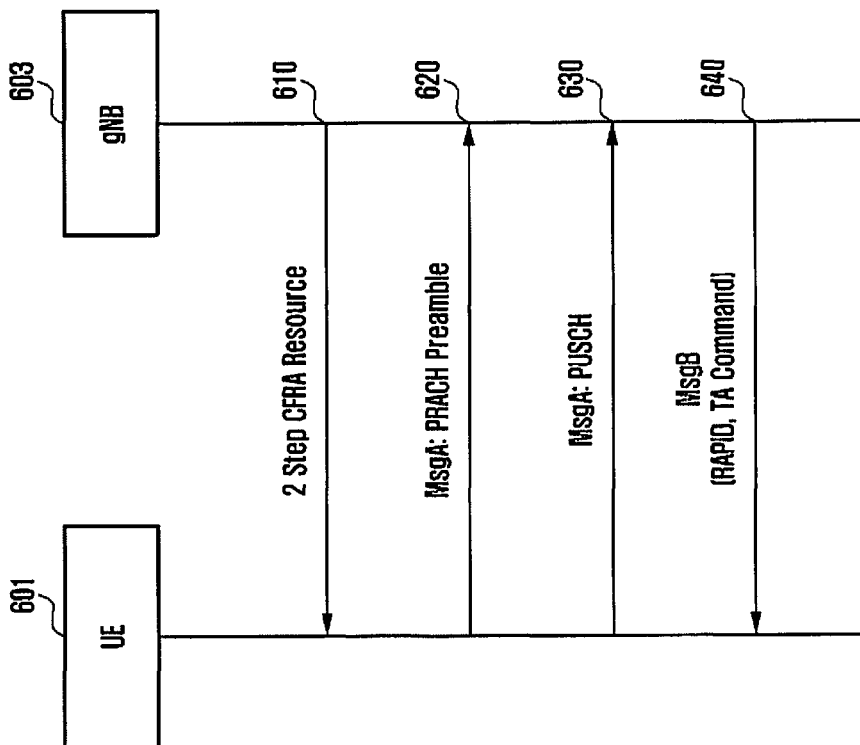

FIGS. 6A and 6B are flow-diagrams of a two-step random access procedure according to an embodiment.

Referring to FIGS. 6A and 6B, in a case of two step CF RACH, a gNB 603 signals contention free random access resources (i.e., dedicated preambles/RACH occasions and PUSCH resources) to a UE 601 in steps 610 and 650, respectively. The UE 601 transmits a PRACH preamble in a PRACH occasion and an msgA payload (or an msgA MAC PDU) in a PUSCH resource/occasion using the assigned contention free random access resources in steps 620, 630, 660, and 670, respectively. The UE 601 stores the msgA payload (i.e., the msgA MAC PDU) in an msgA buffer. For msgA payload transmission, an HARQ entity in the UE 601 performs a new HARQ packet transmission wherein an HARQ packet for transmission is generated using the msgA payload in an msgA buffer. The UE 601 maintains a number of parallel HARQ processes. Each HARQ process supports one TB. Each HARQ process is associated with an HARQ process identifier. For UL transmission for an msgA payload, an HARQ process identifier 0 is used.

After transmitting the msgA, the UE 601 starts an msgB-ResponseWindow and monitors the PDCCH for a random access response (i.e., the msgB) in the msgB-ResponseWindow. The UE 601 monitors a PDCCH of an SpCell for a random access response identified by an MSGB-RNTI while the msgB-ResponseWindow is running. If a C-RNTI MAC CE was included in the msgA payload, the UE 601 additionally monitors the PDCCH of the SpCell for a random access response identified by the C-RNTI while the msgB-ResponseWindow is running.

If the gNB 603 receives the msgA (i.e., both a PRACH preamble and an msgA payload) successfully, the gNB 603 does not include the UL grant in the msgB as shown in FIG. 6A in step 640. If the gNB 603 only receives the PRACH preamble but fails to receive the msgA payload, the gNB 603 includes the UL grant in the msgB as shown in FIG. 6B in step 680. The msgB includes a RAPID corresponding to the PRACH preamble irrespective of whether the gNB 603 receives the msgA payload or not.

If the msgA is transmitted using the contention free random access resource and if the msgB received by the UE 601 includes a RAPID corresponding to the PRACH preamble transmitted by the UE 601 then the UE 601 considers that the msgB is successfully received and the random access procedure is successfully completed.

If the msgB does not include a UL grant, the UE 601 discards the msgA payload, i.e., discards the msgA buffer and an HARQ buffer used for msgA payload transmission.

If the msgB includes a UL grant, the UE 601 retransmits the msgA payload in the UL grant received in the msgB. For msgA payload transmission in the UL grant received in the msgB, an HARQ entity in the UE 601 performs a new HARQ packet transmission wherein an HARQ packet for transmission is generated using the msgA payload in the msgA buffer. For UL transmission for an msgA payload, an HARQ process identifier 0 is used. Upon transmitting the msgA payload in the UL grant received in the msgB, if the UE 601 receives a PDCCH addressed to a C-RNTI for an HARQ process zero with an NDI not toggled, the UE 601 performs an HARQ retransmission.

Figure 7A:
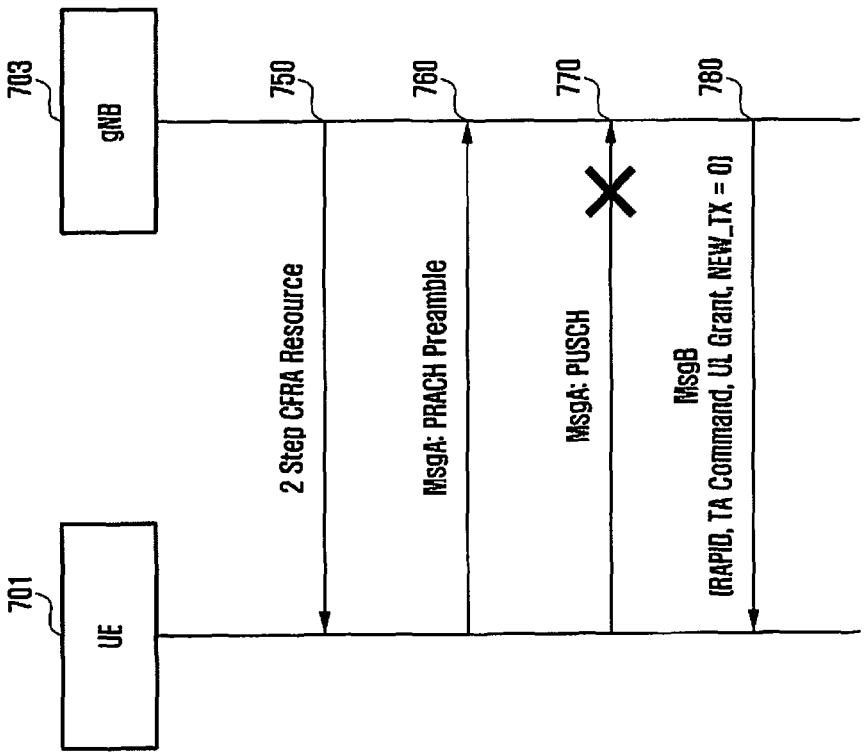
FIGS. 7A and 7B are flow-diagrams of a two-step random access procedure according to an embodiment.
Figure 7B:
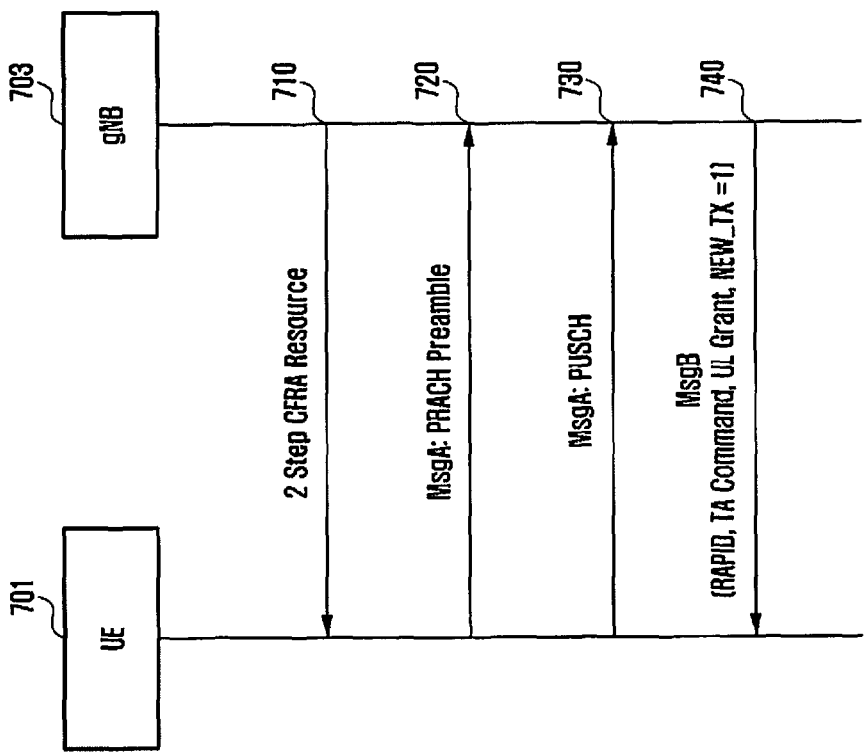

FIGS. 7A and 7B are flow-diagrams of a two-step random access procedure according to an embodiment.

Referring to FIGS. 7A and 7B, in a case of two step CF RACH, a gNB 703 signals contention free random access resources (i.e., dedicated preambles/RACH occasions and PUSCH resources) to a UE 701 in steps 710 and 750, respectively. The UE 701 transmits a PRACH preamble in a PRACH occasion and a msgA payload (or a msgA MAC PDU) in a PUSCH resource/occasion using the assigned contention free random access resources in steps 720, 730, 760, and 770, respectively. The UE 701 stores the msgA payload (i.e., the msgA MAC PDU) in an msgA buffer. For msgA payload transmission, an HARQ entity in the UE 701 performs a new HARQ packet transmission wherein an HARQ packet for transmission is generated using the msgA payload in the msgA buffer. The UE 701 maintains a number of parallel HARQ processes. Each HARQ process supports one TB. Each HARQ process is associated with an HARQ process identifier. For UL transmission for the msgA payload, an HARQ process identifier 0 is used.

After transmitting the msgA, the UE 701 starts an msgB-ResponseWindow and monitors the PDCCH for a random access response (i.e., an msgB) in an msgB-ResponseWindow. The UE 701 monitors a PDCCH of an SpCell for a random access response identified by MSGB-RNTI while the msgB-ResponseWindow is running. If a C-RNTI MAC CE was included in the msgA payload, the UE 701 additionally monitors the PDCCH of the SpCell for a random access response identified by the C-RNTI while the msgB-ResponseWindow is running.

If the gNB 703 receives the msgA (i.e., both the PRACH preamble and the msgA payload) successfully, the gNB 703 sets a NEW_TX bit to 1 in the msgB as shown in FIG. 7A in step 740). If the gNB 701 only receives the PRACH preamble but fails to receive the msgA payload, the gNB 703 sets the NEW_TX bit to 0 in the msgB as shown in FIG. 7B in step 780. The msgB includes a RAPID corresponding to the PRACH preamble irrespective of whether the gNB 703 receives the msgA payload or not.

If the msgA is transmitted using the contention free random access resources and if the msgB received by the UE 701 includes the RAPID corresponding to the PRACH preamble transmitted by the UE 701 then the UE 701 considers that the msgB is successfully received and the random access procedure is successfully completed.

If the msgB includes the NEW_TX bit set to 1 in the msgB, the UE 701 discards the msgA payload, i.e., discards the msgA buffer and an HARQ buffer used for msgA payload transmission. The UE 701 transmits a new MAC PDU in a UL grant received in the msgB.

If the msgB includes the NEW_TX bit set to 0, the UE 701 retransmits the msgA payload in the UL grant received in the msgB. For msgA payload transmission in the UL grant received in the msgB, an HARQ entity in the UE 701 performs a new HARQ packet transmission wherein an HARQ packet for transmission is generated using the msgA payload in the msgA buffer. For UL transmission for the msgA payload, an HARQ process identifier 0 is used. Upon transmitting the msgA payload in the UL grant received in the msgB, if the UE 701 receives a PDCCH addressed to a C-RNTI for an HARQ process zero with an NDI not toggled, the UE 701 performs an HARQ retransmission. If the msgB includes the NEW_TX bit set to 0 and a UL grant is not received in the msgB, the UE 701 retransmits the msgA payload in a subsequent UL grant using an HARQ process zero upon receiving a PDCCH addressed to a C-RNTI for an HARQ process zero with an NDI not toggled.

Figure 8A:
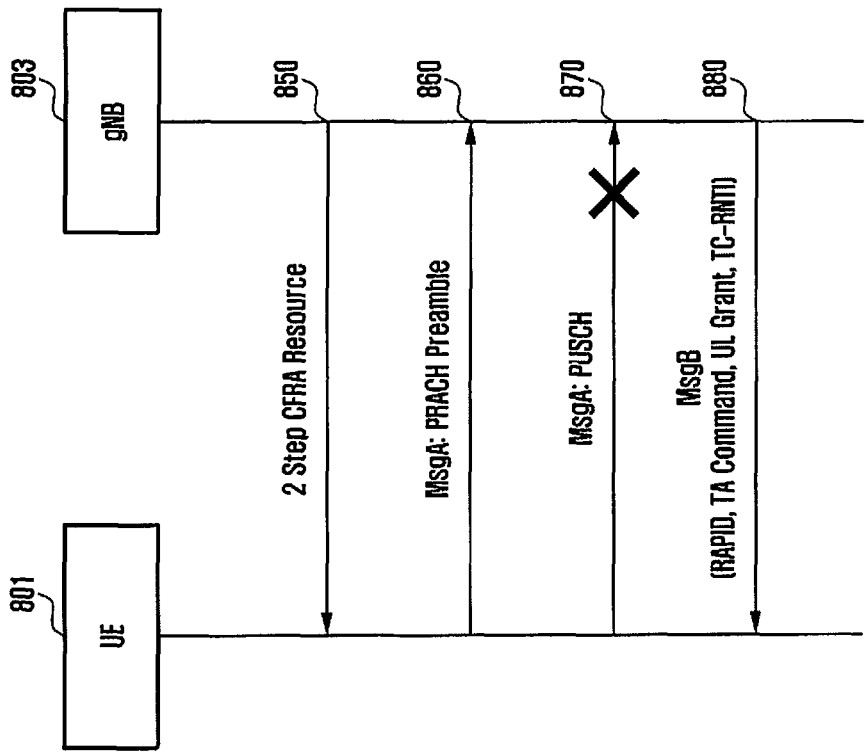
FIGS. 8A and 8B are flow-diagrams of a two-step random access procedure according to an embodiment.
Figure 8B:
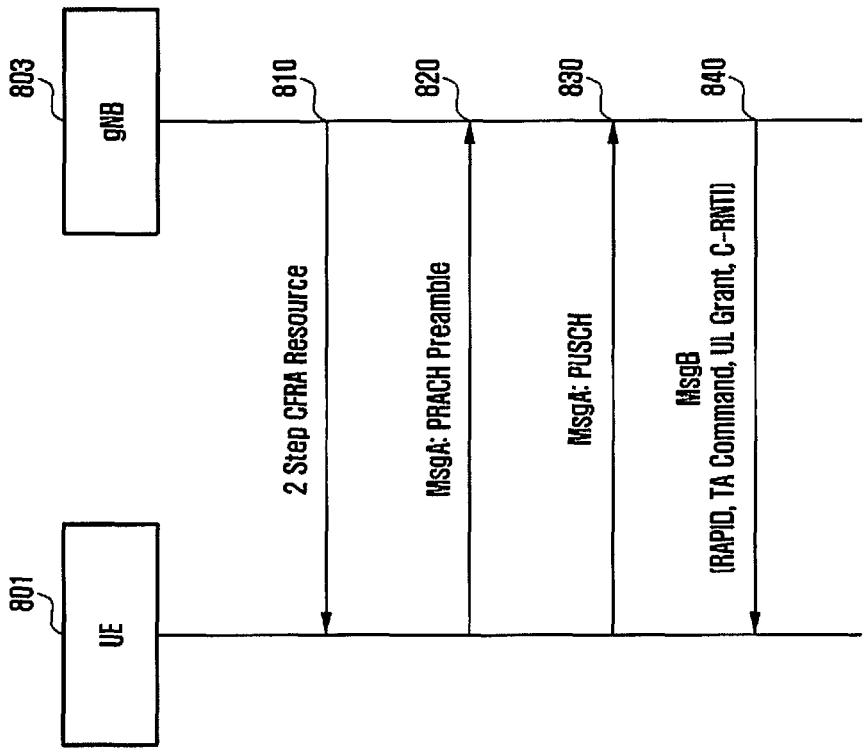

FIGS. 8A and 8B are flow-diagrams of a two-step random access procedure according to an embodiment.

Referring to FIGS. 8A and 8B, in a case of two-step CF RACH, a gNB 803 signals contention free random access resources (i.e., dedicated preambles/RACH occasions and PUSCH resources) to a UE 801 in steps 810 and 850, respectively. The UE 801 transmits a PRACH preamble in a PRACH occasion and an msgA payload (or an msgA MAC PDU) in a PUSCH resource/occasion using the assigned contention free random access resources in steps 820, 830, 860, and 870, respectively. The UE 801 stores the msgA payload (i.e., an msgA MAC PDU) in an msgA buffer. For msgA payload transmission, an HARQ entity in the UE 801 perform a new HARQ packet transmission wherein an HARQ packet for transmission is generated using the msgA payload in the msgA buffer. The UE 801 maintains a number of parallel HARQ processes. Each HARQ process supports one TB. Each HARQ process is associated with an HARQ process identifier. For UL transmission for the msgA payload, an HARQ process identifier 0 is used.

After transmitting the msgA, the UE 801 starts an msgB-ResponseWindow and monitors the PDCCH for a random access response (i.e., an msgB) in an msgB-ResponseWindow. The UE 801 monitors a PDCCH of an SpCell for a random access response identified by an MSGB-RNTI while the msgB-ResponseWindow is running. If a C-RNTI MAC CE was included in the msgA payload, the UE 801 additionally monitors the PDCCH of the SpCell for a random access response identified by the C-RNTI while the msgB-ResponseWindow is running.

If the gNB 803 receives the msgA (i.e., both the PRACH preamble and the msgA payload) successfully, the gNB 803 includes a RAPID, a TA command, a UL grant, a C-RNTI of the UE 801 (which transmitted the msgA) in the msgB as illustrated in FIG. 8A in step 840. A PDCCH for the msgB is addressed to MSGB-RNTI. Upon receiving the msgB wherein the RAPID corresponds to the random access preamble transmitted by the UE 801, the random access procedure is successfully completed. In this case, the UE 801 discards the msgA payload, i.e., discards the msgA buffer and an HARQ buffer used for the msgA payload transmission.

The gNB 803 may identify the UE 801 from the received PRACH preamble. The PRACH preamble is received in a contention free resource assigned to the UE 801. If the gNB 803 only receives the PRACH preamble but fails to receive the msgA payload, the gNB 80-3 includes the RAPID, the TA command, the UL grant and a temporary C-RNTI (a TC-RNTI) in the msgB as shown in FIG. 8B in step 880.

If the msgB includes the RAPID, the TA command, the UL grant and the TC-RNTI wherein the RAPID corresponds to the random access preamble transmitted by the UE 801, the random access procedure is successfully completed. The UE 801 retransmits the msgA payload in the UL grant received in the msgB. For msgA payload transmission in the UL grant received in the msgB, an HARQ entity in the UE 801 performs a new HARQ packet transmission wherein an HARQ packet for transmission is generated using the msgA payload in the msgA buffer. For UL transmission for the msgA payload, an HARQ process identifier 0 is used. Upon transmitting the msgA payload in the UL grant received in the msgB, if the UE 801 receives a PDCCH addressed to a C-RNTI for an HARQ process zero with an NDI not toggled, the UE 801 performs an HARQ retransmission. If a UL grant is not received in the msgB, the UE 801 retransmits the msgA payload in a subsequent UL grant using an HARQ process zero upon receiving a PDCCH addressed to a C-RNTI for an HARQ process zero with an NDI not toggled.

If the gNB 803 receives the msgA (i.e., both the PRACH preamble and the msgA payload) successfully, the gNB 803 transmits a PDCCH addressed to a C-RNTI of the UE 801 (which transmitted the msgA), wherein the PDCCH may schedule a UL grant for a new transmission or the PDCCH may include a DL assignment. Upon receiving the PDCCH, the random access procedure is successfully completed. In this case, the UE 801 discards the msgA payload, i.e., discards the msgA buffer and an HARQ buffer used for msgA payload transmission.

The gNB 803 may identify the UE 801 from the received PRACH preamble. The PRACH preamble is received in a contention free resource assigned to the UE 801. If the gNB 803 only receives the PRACH preamble but fails to receive the msgA payload, the gNB 803 includes a RAPID, a TA command, a UL grant and a TC-RNTI in an msgB. The PDCCH for the msgB is addressed to an MSGB-RNTI.

If the msgB includes the RAPID, the TA command, the UL grant and the TC-RNTI wherein the RAPID corresponds to random access preamble transmitted by the UE 801, the random access procedure is successfully completed. The UE 801 retransmits the msgA payload in the UL grant received in the msgB. For msgA payload transmission in the UL grant received in the msgB, an HARQ entity in the UE 801 performs a new HARQ packet transmission wherein an HARQ packet for transmission is generated using the msgA payload in the msgA buffer. For a UL transmission for the msgA payload, an HARQ process identifier 0 is used. Upon transmitting the msgA payload in the UL grant received in the msgB, if the UE 801 receives a PDCCH addressed to a C-RNTI for an HARQ process zero with an NDI not toggled, the UE 801 performs an HARQ retransmission.

If the gNB 803 receives the msgA (i.e., both the PRACH preamble and the msgA payload) successfully, the gNB 803 transmits a PDCCH addressed to a C-RNTI of the UE 801 (which transmitted the msgA), wherein the PDCCH may schedule a UL grant for a new transmission or a DL assignment. Upon receiving the PDCCH, the random access procedure is successfully completed. In this case, the UE 801 discards the msgA payload, i.e., discards the msgA buffer. However, the HARQ buffer used for msgA payload transmission is not discarded.

The gNB 803 may identify the UE 801 from the received PRACH preamble. The PRACH preamble is received in a contention free resource assigned to the UE 801. If the gNB 803 only receives the PRACH preamble but fails to receive the msgA payload, the gNB 803 transmits a PDCCH addressed to a C-RNTI of the UE 801, wherein the PDCCH may schedule a UL grant for a new transmission or a DL assignment. Upon receiving the PDCCH, the random access procedure is successfully completed. In this case, the UE 801 discards the msgA payload, i.e., discards the msgA buffer. However, the HARQ buffer used for msgA payload transmission is not discarded.

Upon completion of the random access procedure, if the gNB 803 has not received the msgA payload during the random access procedure, the gNB 803 will transmit a PDCCH addressed to a C-RNTI for an HARQ process zero with an NDI not toggled. If the UE 801 receives the PDCCH addressed to the C-RNTI for the HARQ process zero with the NDI not toggled, the UE 801 performs an HARQ retransmission.

Upon completion of random access procedure:
if this random access procedure was completed upon receiving fallbackRAR (fallback RAR is received in msgB and consists of RAPID, TA, TC-RNTI and UL grant):
UE does not flush the HARQ buffer used for transmission of the MAC PDU in the Msg3 buffer and the msgA buffer;
if this random access procedure was not completed upon receiving fallbackRAR
flush the HARQ buffer used for transmission of the MAC PDU in the msg3 buffer and the msgA buffer In an embodiment of the proposed invention, upon completion of random access procedure:
if last random access preamble transmitted was not selected from contention based preambles:
UE does not flush the HARQ buffer used for transmission of the MAC PDU in the Msg3 buffer and the msgA buffer;
Else:
flush the HARQ buffer used for transmission of the MAC PDU in the msg3 buffer and the msgA buffer In an embodiment of the proposed invention, upon completion of random access procedure:
if last random access preamble transmitted was not selected from contention based preambles and:
UE does not flush the HARQ buffer used for transmission of the MAC PDU in the Msg3 buffer and the msgA buffer;
Else:
flush the HARQ buffer used for transmission of the MAC PDU in the msg3 buffer and the msgA buffer FIGS. 9A and 9B are flow-diagrams of a two-step random access procedure according to an embodiment.

Figure 9A:
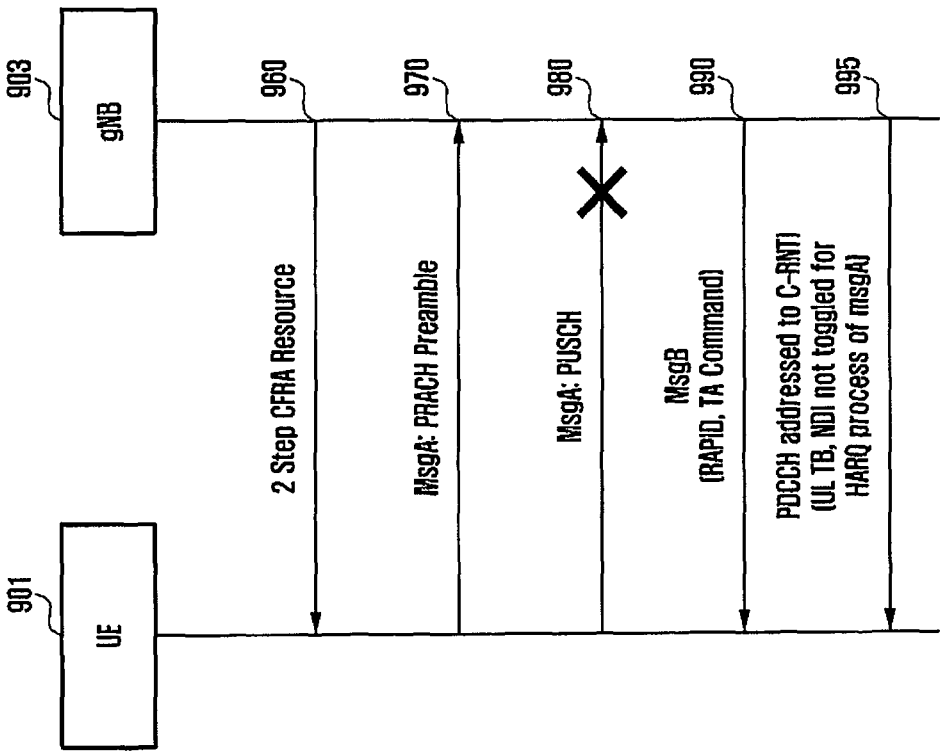
FIGS. 9A and 9B are flow-diagrams of a two-step random access procedure according to an embodiment.
Figure 9B:
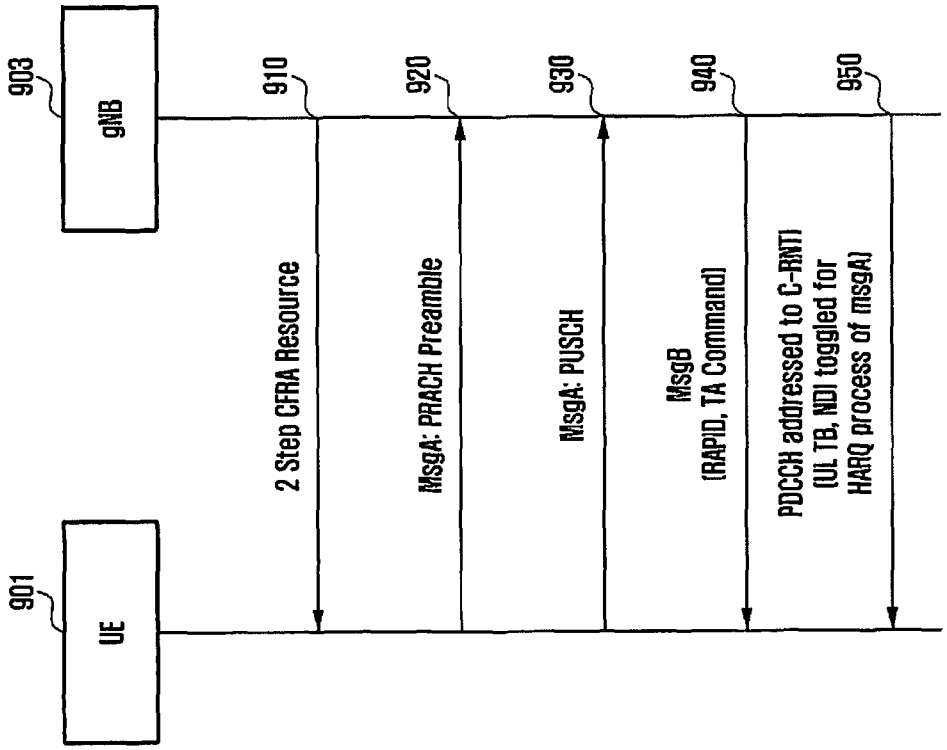

Referring to FIGS. 9A and 9B, in a case of two step CF RACH, an gNB 903 signals contention free random access resources (i.e., dedicated preambles/RACH occasions and PUSCH resources) to a UE 901 in steps 910 and 960, respectively. The UE 901 transmits a PRACH preamble in a PRACH occasion and an msgA payload (or an msgA MAC PDU) in a PUSCH resource/occasion using the assigned contention free random access resources in steps 920, 930, 970, and 980, respectively. The UE 901 stores the msgA payload (i.e., an msgA MAC PDU) in an msgA buffer. For msgA payload transmission, an HARQ entity in the UE 901 perform a new HARQ packet transmission wherein an HARQ packet for transmission is generated using the msgA payload in the msgA buffer. The UE 901 maintains a number of parallel HARQ processes. Each HARQ process supports one TB. Each HARQ process is associated with an HARQ process identifier. For UL transmission for the msgA payload, an HARQ process identifier 0 is used.

After transmitting the msgA, the UE 901 starts an msgB-ResponseWindow and monitors the PDCCH for a random access response (i.e., an msgB) in the msgB-ResponseWindow. The UE 901 monitors a PDCCH of an SpCell for a random access response identified by an MSGB-RNTI while the msgB-ResponseWindow is running. If a C-RNTI MAC CE was included in the msgA payload, the UE 901 additionally monitors the PDCCH of the SpCell for a random access response identified by the C-RNTI while the msgB-ResponseWindow is running.

If the gNB 901 receives the msgA (i.e., both the PRACH preamble and the msgA payload) successfully, the gNB 901 transmits a RAPID and a TA command in the msgB as shown in FIG. 9A in step 940. Subsequently, the gNB 903 transmits a PDCCH addressed to a C-RNTI of the UE 901 scheduling an UL grant and an NDI bit in a DCI is toggled for an HARQ process ID (e.g. an HARQ process zero) reserved for the msgA in step 950. If the gNB 903 only receives the PRACH preamble but fails to receive the msgA payload, the gNB 903 transmits the RAPID and a TA command in the msgB as shown in FIG. 9B in step 990. Subsequently, the gNB 903 transmits a PDCCH addressed to a C-RNTI of the UE 901 scheduling an UL grant and an NDI bit in DCI is not toggled for an HARQ process ID reserved for the msgA in step 995. The gNB 903 may identify the UE 901 from the received PRACH preamble. The PRACH preamble is received in a contention free resource assigned to a specific UE.

If the msgA is transmitted using the contention free resource and if the msgB received by the UE 901 includes a RAPID corresponding to the PRACH preamble transmitted by the UE 901, then the UE 901 considers that the msgB is successfully received and a random access procedure is successfully completed.

Upon successful completion of a random access procedure, if the UE 901 receives a PDCCH addressed to a C-RNTI scheduling an UL grant and an NDI bit in a DCI is toggled for an HARQ process ID reserved for an msgA, the UE 901 discards the msgA payload. The UE 901 transmits a new MAC PDU in the received UL grant.

Upon successful completion of a random access procedure, if the UE 901 receives a PDCCH addressed to a C-RNTI scheduling an UL grant and an NDI bit in a DCI is not toggled for an HARQ process ID reserved for an msgA, the UE 901 retransmits the msgA payload in the received UL grant.

Figure 10B:
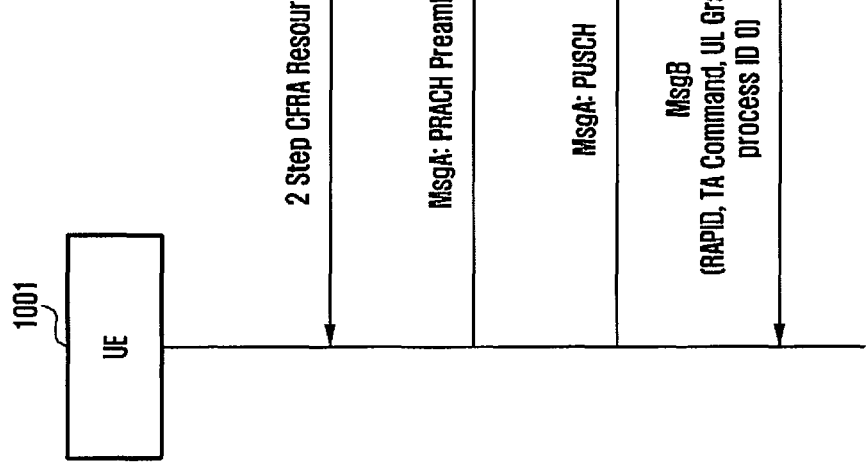
FIGS. 10A and 10B are flow-diagrams of a two-step random access procedure according to an embodiment.
Figure 10A:
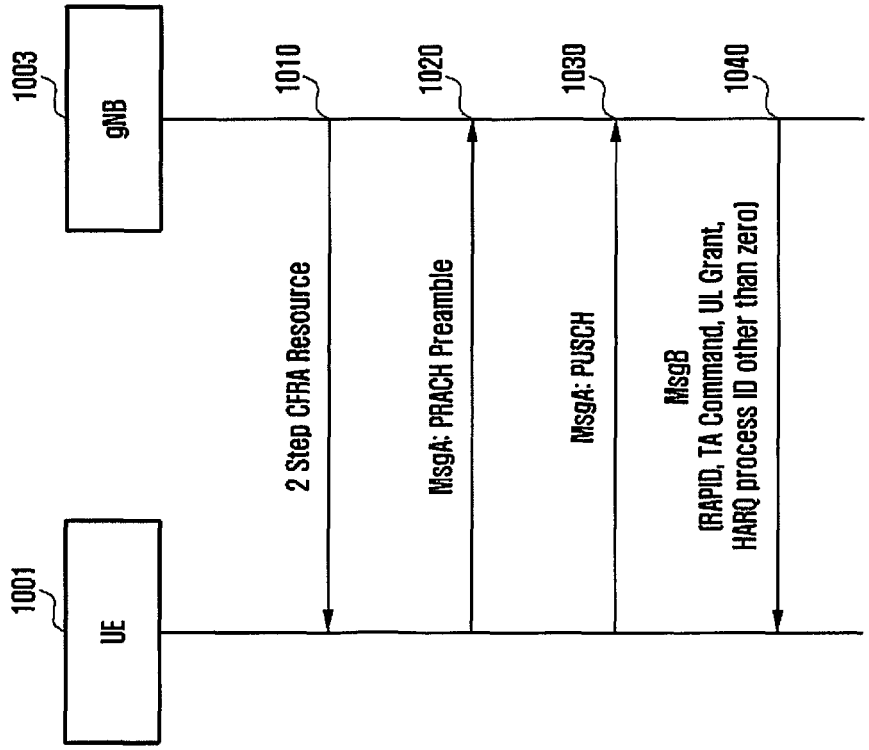

FIGS. 10A and 10B are flow-diagrams of a two-step random access procedure according to an embodiment.

Referring to FIGS. 10A and 10B, in a case of two step CF RACH, a gNB 1003 signals contention free random access resources (i.e., dedicated preambles/RACH occasions and PUSCH resources) to a UE 1001 in steps 1010 and 1050, respectively, the UE 1001 transmits an msgA PRACH preamble and an msgA payload in steps 1020, 1030, 1060, and 1070, respectively. The UE 1001 stores the msgA payload (i.e., a MAC PDU) in an msgA buffer. For msgA payload transmission, an HARQ entity in the UE 1001 performs a new HARQ packet transmission wherein an HARQ packet for transmission is generated using the msgA payload in the msgA buffer. The UE 1001 maintains a number of parallel HARQ processes. Each HARQ process supports one TB. Each HARQ process is associated with an HARQ process identifier. For UL transmission for the msgA payload, an HARQ process identifier 0 is used.

After transmitting the msgA, the UE 1001 starts an msgB-ResponseWindow and monitors the PDCCH for a random access response (i.e., an msgB) in an msgB-ResponseWindow. The UE 1001 monitors a PDCCH of an SpCell for a random access response identified by an MSGB-RNTI while the msgB-ResponseWindow is running. If a C-RNTI MAC CE was included in the msgA payload, the UE 1003 additionally monitors the PDCCH of the SpCell for a random access response identified by the C-RNTI while the msgB-ResponseWindow is running.

If the gNB 1003 receives the msgA (i.e., both the PRACH preamble and the msgA payload) successfully, the gNB 1003 transmits a RAPID, a TA a command and a UL grant in the msgB as shown in FIG. 10A in step 1040. The HARQ process ID other than zero is included in the msgB. If the gNB 1003 only receives the PRACH preamble but fails to receive the msgA payload, the gNB 1003 transmits the RAPID, the TA command and the UL grant in msgB as shown in FIG. 10B in step 1080. The HARQ process ID zero is included in the msgB in this case.

If the msgA is transmitted using the contention free resource and if the msgB received by the UE 1001 includes a RAPID corresponding to the PRACH preamble transmitted by the UE 1001 then the UE 1001 considers that the msgB is successfully received and the random access procedure is successfully completed.

If the msgB includes an HARQ process ID other than zero, the UE 1001 discards the msgA payload. The UE 1001 transmits a new MAC PDU in the UL grant received in the msgB.

If the msgB includes an HARQ process ID zero, the UE 1001 retransmits the msgA payload in the UL grant received in the msgB. For msgA payload transmission in the UL grant received in the msgB, an HARQ entity in the UE 1001 performs a new HARQ packet transmission wherein an HARQ packet for transmission is generated using the msgA payload in the msgA buffer. For UL transmission for the msgA payload, an HARQ process identifier 0 is used. Upon transmitting the msgA payload in the UL grant received in the msgB, if the UE 1001 receives a PDCCH addressed to a C-RNTI for an HARQ process zero with an NDI not toggled, the UE 1001 performs an HARQ retransmission. If the msgB includes an HARQ process ID zero and if an UL grant is not received in the msgB, the UE 1001 retransmits the msgA payload in a subsequent UL grant using an HARQ process zero upon receiving a PDCCH addressed to a C-RNTI for an HARQ process zero with an NDI not toggled.

2 Step RACH: Msg3 MAC PDU Generation During Fallback

Figure 11:
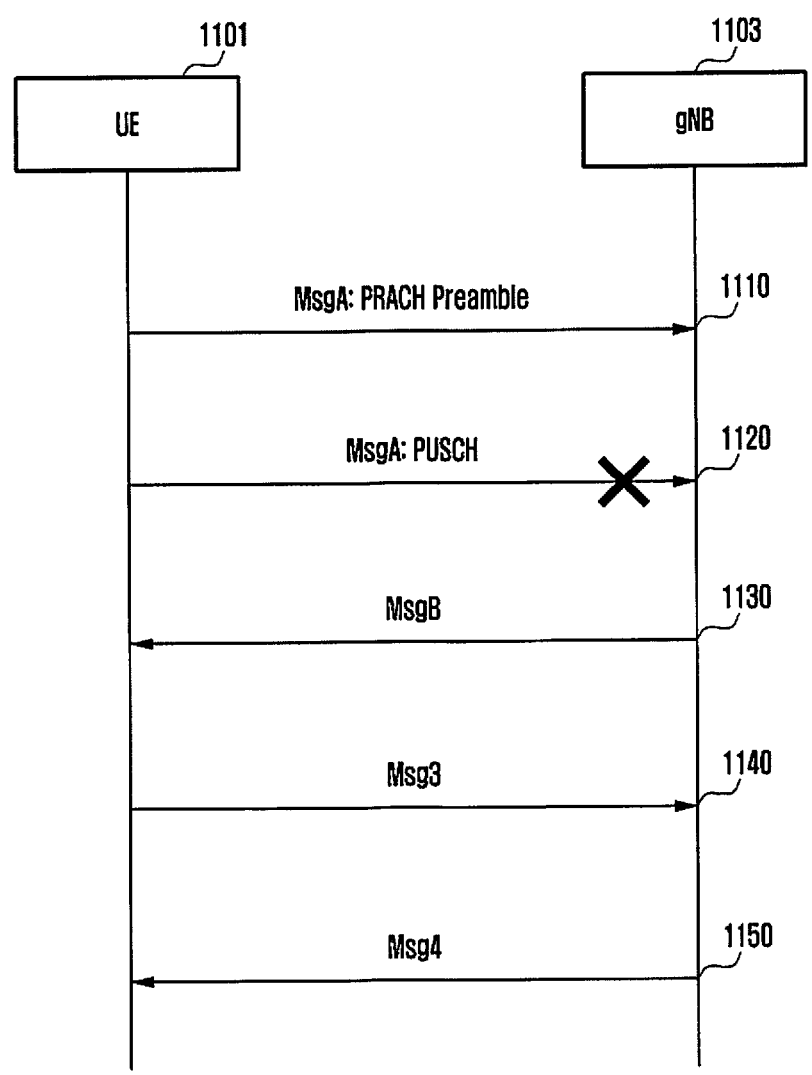
FIG. 11 is a flow-diagram of a contention based two-step random access procedure according to an embodiment.

FIG. 11 is a flow-diagram of a contention based two-step random access procedure according to an embodiment.

Referring to FIG. 11, in a case of two-step contention based RACH, if a gNB 1103 only receives a PRACH preamble but fails to receive an msgA payload in steps 1110 and 1120, the gNB 1103 may indicate to the UE 1101 to fallback to a four step RACH. For indicating the fallback, the gNB 1103 transmits a RAPID, a TA command, a UL grant and a TC-RNTI in an msgB as shown in FIG. 11 step 1130. Upon receiving the fallback indication in the msgB, the UE 1101 generates and transmits an msg3 in a UL grant received in an msgB in step 1140. The contention resolution is performed via an msg4 as in a four step RACH procedure in step 1150.

In a four step RACH upon receiving a UL grant in an msg2 a new MAC PDU is generated for an msg3 using an available MAC CE(s) and an SDU(s) in a logical channel buffer(s) in a MAC. In a case of two step RACH, the required information is not available in a logical channel buffer(s) as it is already transmitted in the msgA.

Figure 12:
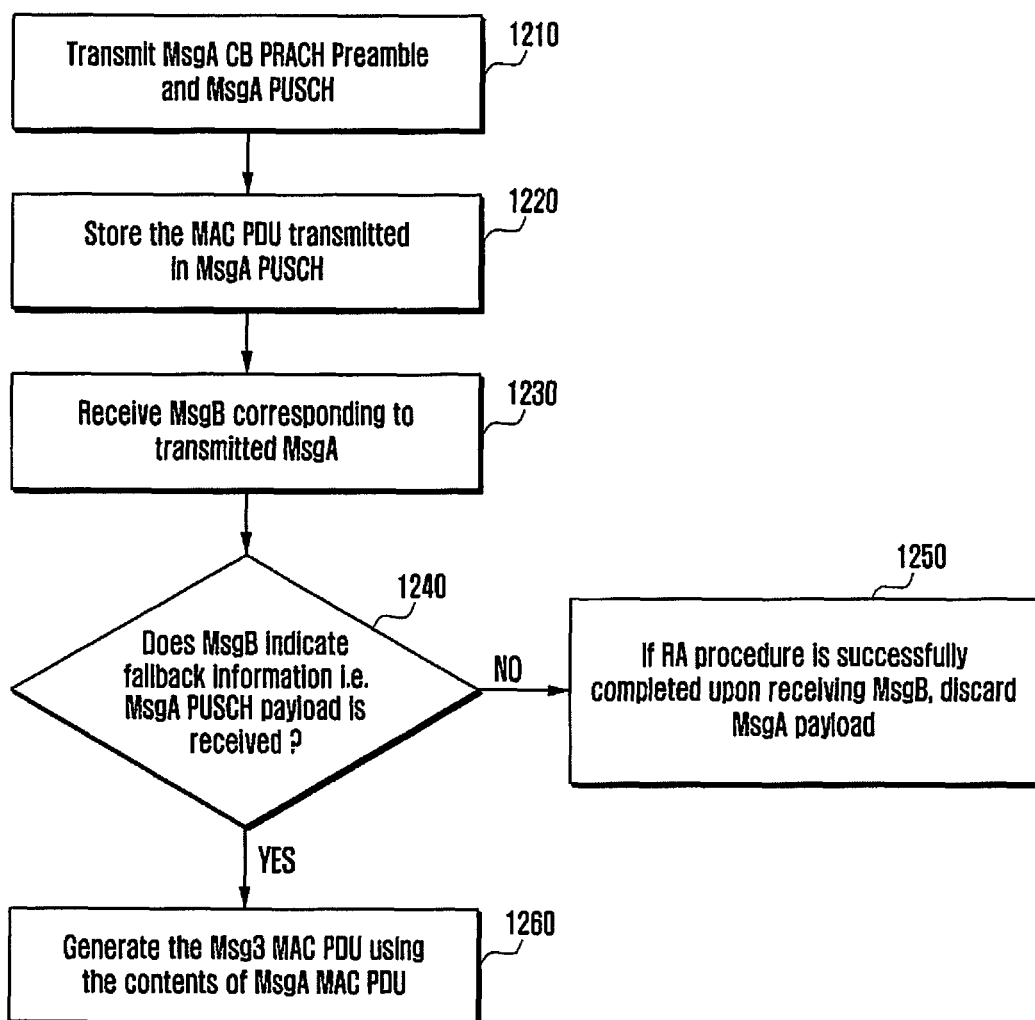
FIG. 12 is a flowchart of a contention based two-step random access method according to an embodiment.

FIG. 12 is a flowchart of a contention based two-step random access procedure according to an embodiment.

Referring to FIG. 12, a UE stores a MAC PDU transmitted in an msgA. If an RA procedure is successfully completed upon receiving an msgB, the UE discards the stored msgA MAC PDU. If the msgB indicates fall back, the UE prepares an msg3 MAC PDU using contents of an msgA MAC PDU.

The UE transmits a PRACH preamble in a PRACH occasion and an msgA payload (or an msgA MAC PDU) in a PUSCH resource/occasion in step 1210. A PRACH preamble is a contention based preamble. The UE stores the msgA payload (i.e., the msgA MAC PDU) in an msgA buffer in step 1220. For msgA payload transmission, an HARQ entity in the UE performs a new HARQ packet transmission wherein an HARQ packet for transmission is generated using the msgA payload in the msgA buffer. The UE maintains a number of parallel HARQ processes. Each HARQ process supports one TB. Each HARQ process is associated with an HARQ process identifier. For UL transmission for the msgA payload, an HARQ process identifier 0 is used.

After transmitting the msgA, the UE starts a msgB-ResponseWindow and monitors a PDCCH for a random access response (i.e., the msgB) in an msgB-ResponseWindow. The UE monitors a PDCCH of an SpCell for a random access response identified by an MSGB-RNTI while the msgB-ResponseWindow is running. If a C-RNTI MAC CE was included in the msgA payload, the UE additionally monitors the PDCCH of the SpCell for a random access response identified by the C-RNTI while the msgB-ResponseWindow is running.

If the UE receives the msgB in step 1230, and the msgB includes fallback information, i.e., a RAPID, a TA, a TC-RNTI and a UL grant and the RAPID in the fallback information matches the random access preamble index of the PRACH preamble transmitted by the UE in step 1240, the UE prepares an msg3 MAC PDU using contents of the msgA MAC PDU and transmits the msg3 MAC PDU in the UL grant received in the msgB in step 1260. Otherwise, if the msgB does not include fallback information and the RA procedure is successfully completed upon receiving the msgB, the UE discards the msgA payload in steps 1240 and 1250.

For msg3 payload transmission in the UL grant received in the msgB, an HARQ entity in the UE performs a new HARQ packet transmission wherein an HARQ packet for transmission is generated using the msg3 payload. For UL transmission for the msg3 payload, an HARQ process identifier 0 is used. Upon transmitting the msg3 payload in the UL grant received in the msgB, if the UE receives a PDCCH addressed to a TC-RNTI for an HARQ process zero, the UE performs an HARQ retransmission.

Figure 13:
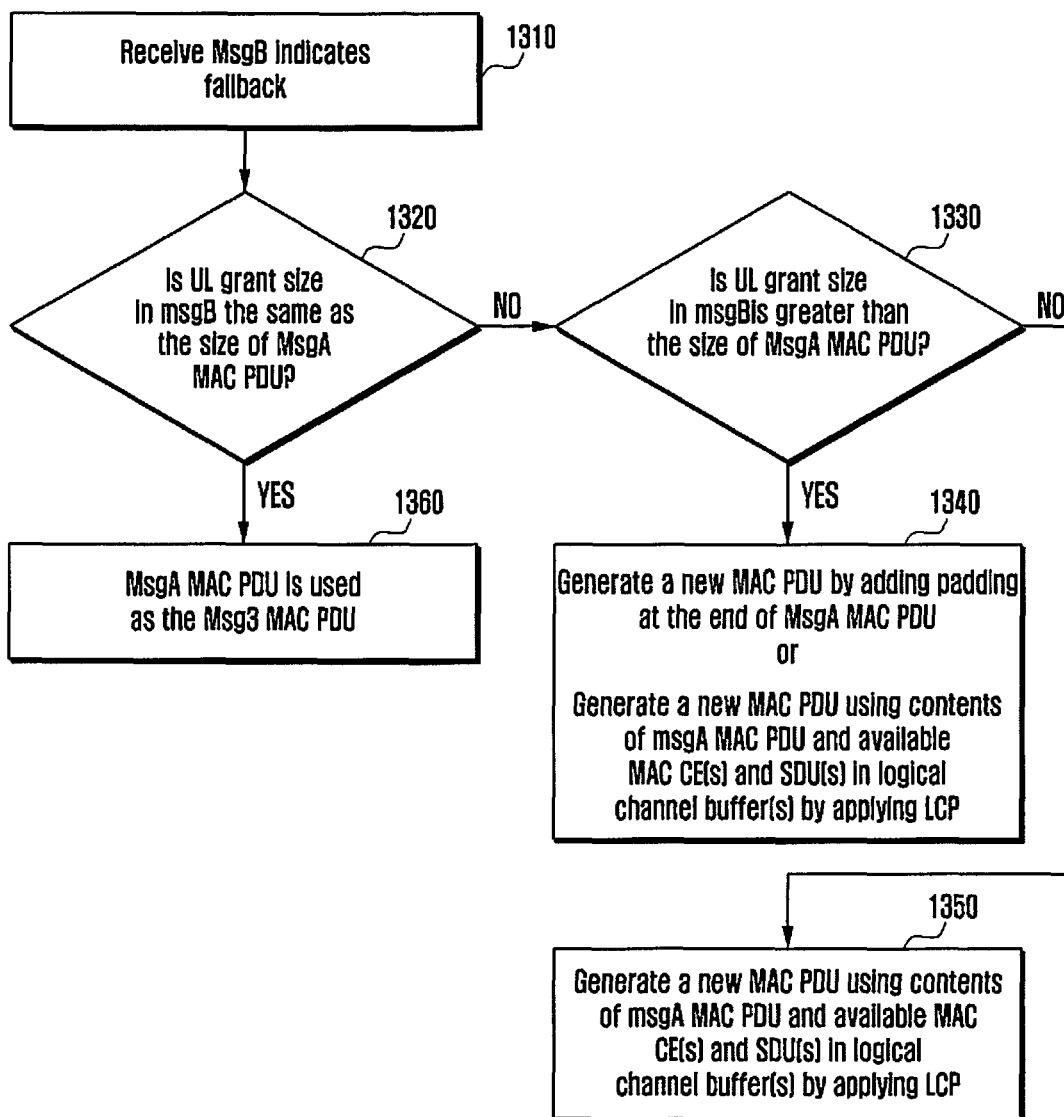
FIG. 13 is a flowchart of a contention based two-step random access method according to an embodiment.

FIG. 13 is a flowchart of a contention based two-step random access procedure according to an embodiment.

Referring to FIG. 13, when a received msgB indicates fallback in step 1310, a UE generates an msg3 MAC PDU using contents of an msgA MAC PDU as follows.

If a UL grant size in the msgB is the same as the size of the msgA MAC PDU, the UE uses the msgA MAC PDU as the msg3 MAC PDU in steps 1320 and 1360.

If the UL grant size in the msgB is greater than the size of the msgA MAC PDU in step 1330, the UE generates a new MAC PDU by adding padding at the end of the msgA MAC PDU in step 1340. Alternatively, the UE generates a new MAC PDU using contents of the msgA MAC PDU and available MAC CE(s) and SDU(s) in a logical channel buffer(s) by applying a logical channel prioritization (LCP) in step 1340.

Alternatively, the UE generates a new MAC PDU using a MAC subPDU(s) carrying a MAC SDU from the msgA MAC PDU and available MAC CE(s) and SDU(s) in a logical channel buffer(s) by applying an LCP. In other words, the UE indicates to the multiplexing and assembly entity to include a MAC subPDU(s) carrying a MAC SDU from the obtained msgA MAC PDU in a subsequent uplink transmission in step 1340.

Alternatively, a MAC of the UE may inform the RLC entities of a logical channel(s) whose MAC SDU(s) is included in the msgA MAC PDU that those MAC SDUs are lost. The lost MAC SDU(s) may also be provided to RLC entities by a MAC. RLC entities may then retransmit those MAC SDU(s) in step 1340.

If a UL grant size in the msgB is less than the size of a MsgA MAC PDU in step 1330, the UE generates a new MAC PDU using contents of the msgA MAC PDU and an available MAC CE(s) and an SDU(s) in a logical channel buffer(s) by applying LCP. The UE discards the msgA MAC PDU in step 1350.

Alternatively, the UE generates a new MAC PDU using a MAC subPDU(s) carrying a MAC SDU from the msgA MAC PDU and an available MAC CE(s) and an SDU(s) in a logical channel buffer(s) by applying LCP. In other words, the UE indicates to the multiplexing and assembly entity to include a MAC subPDU(s) carrying a MAC SDU from the obtained msgA MAC PDU in a subsequent uplink transmission in step 1350.

Alternatively, a MAC of the UE may inform the RLC entities of a logical channel(s) whose MAC SDU(s) is included in the msgA MAC PDU that those MAC SDUs are lost. The lost MAC SDU(s) may also be provided to RLC entities by the MAC. RLC entities may then retransmit those MAC SDU(s) in step 1350.

MsgB Reception Timing

Figure 14:
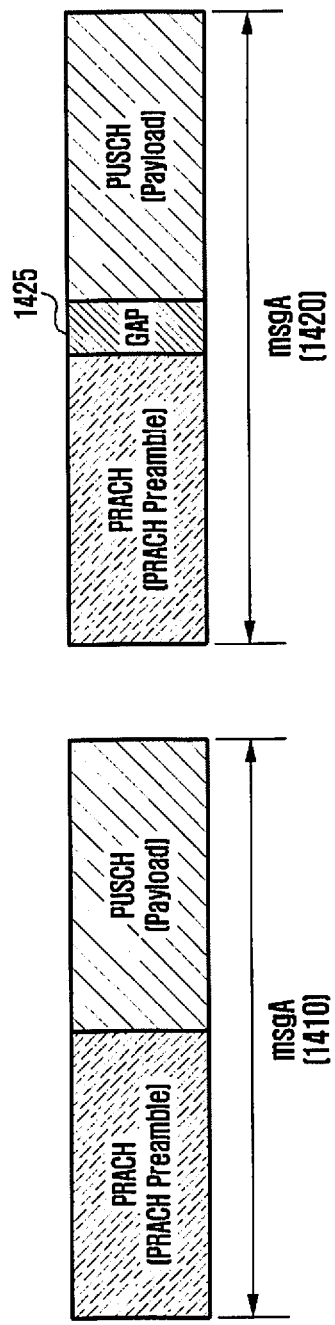
FIG. 14 is an illustration of a message A (MSGA) reception timing according to an embodiment.

FIG. 14 is an illustration of a message A(or msgA) reception timing according to an embodiment.

Referring to FIG. 14, in a two-step RACH, a channel structure of the msgA includes a PRACH preamble and a PUSCH carrying a payload 1410 and 1420. The PRACH preamble and the PUSCH (or, additionally a GAP 1425 in the msgA are time division multiplexed (TDMed). Thus, instead of starting an msgB-ResponseWindow from the end of the random access preamble transmission in msgA, an msgB-ResponseWindow for an msgB reception starts at the first PDCCH occasion for the msgB reception that is at least one symbol away from the end of a PUSCH transmission in the msgA. In other words, the msgB-ResponseWindow for msgB reception starts at the first PDCCH occasion for msgB reception that is at least one symbol after the last symbol of the PUSCH occasion corresponding to the PUSCH transmission. The PDCCH occasions for msgB reception are configured by ra-SearchSpace parameters in PDCCH-ConfigCommon information element (IE) of the BWP used for RA procedure.

During the two step random access procedure, if only a PRACH preamble is transmitted by the UE during the msgA transmission, an msgB-ResponseWindow starts at the first PDCCH occasion for a random access response (i.e., the msgB) that is at least one symbol away from the end of the random access preamble transmission. The msgA payload in a PUSCH occasion is not transmitted if there is no available PUSCH occasion corresponding to a PRACH preamble and a PRACH occasion selected by UE. An msgA payload is not transmitted if a channel is not available during a PUSCH occasion in case a UL transmission is on an unlicensed spectrum. If both a PRACH preamble and a PUSCH are transmitted by the UE, an msgB-ResponseWindow for a random access response (i.e., the msgB), reception starts at the first PDCCH occasion for a response reception that is at least one symbol away from the end of a PUSCH in the msgA.

PUSCH Resource Signaling for MsQA Payload in 2 Step RACH

Figure 15:
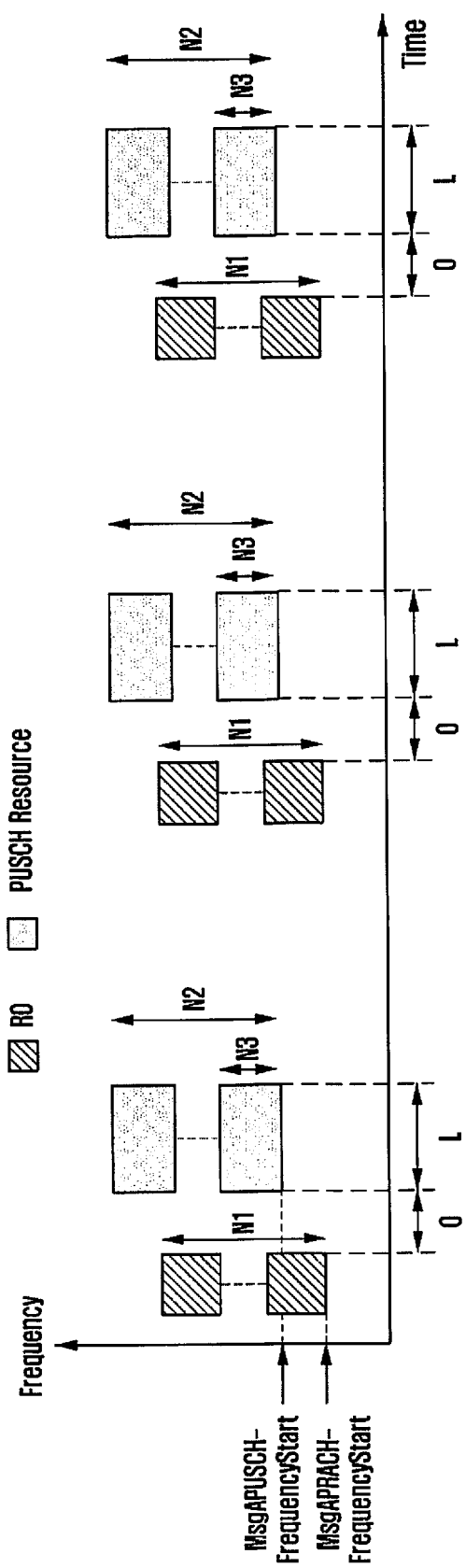
FIG. 15 is an illustration of a physical uplink shared channel (PUSCH) resource signaling according to an embodiment.

FIG. 15 is an illustration of PUSCH resource signaling according to an embodiment.

Referring to FIG. 15, a gNB signals parameters N2, N3, L, O and MsgAPUSCH-FrequencyStart. These parameters are signaled for each BWP supporting a two-step RACH. These parameters may be signaled as part of a two-step RACH configuration in system information or dedicated RRC signaling. Using these parameters, a UE may identify PUSCH resources with respect to each set of frequency division multiplexed (FDMed) PRACH occasions as shown in FIG. 15. The set of FDMed PRACH occasions refers to RACH occasions of a PRACH slot. The slots having PRACH occasions are configured by parameter PRACH configuration (config) index as in the legacy four step RACH. MsgAPUSCH-FrequencyStart indicates a starting PRB of FDMed PUSCH resources in the frequency domain. The starting PRB is indicated with respect to PRB 0 of BWP. N2 is a number of FDMed PUSCH resources. N3 is a number of PRBs in one PUSCH resource. L is a length in symbols and/or slots of a PUSCH resource. O is an offset of a PUSCH resource with respect to a PRACH occasion, i.e., with respect to a start or an end of a PRACH slot carrying the PRACH occasion. The offset may be in a unit of symbols or slots. The number of PUSCH resources mapped to one PRACH occasion equals N2/N1; for N2>=N1 where N1 is a number of FDMed PRACH occasions. For N2 less than N1, N1/N2 PRACH occasions are mapped to one PUSCH resource. In this case, preambles used in PRACH occasions mapped to the same PUSCH resource should be different.

Figure 16:
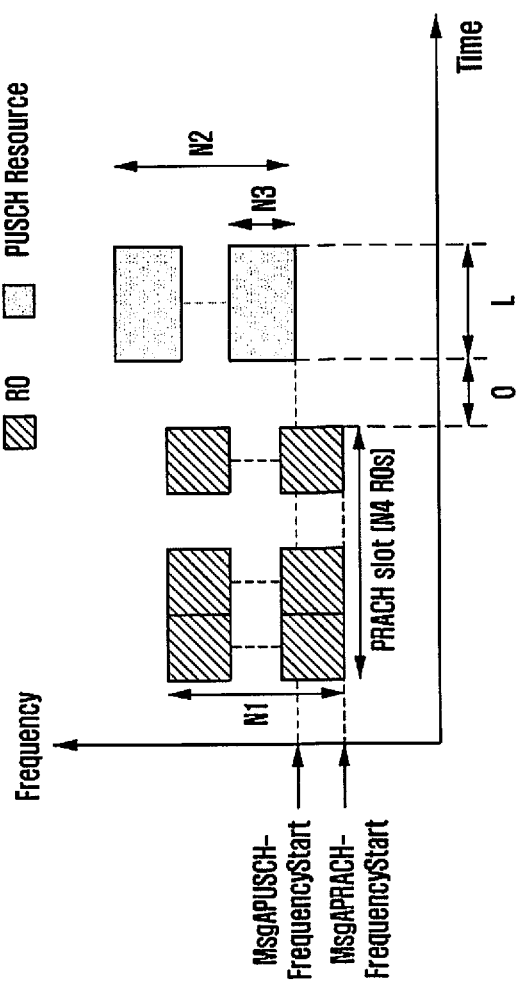
FIG. 16 is an illustration of a PUSCH resource signaling according to an embodiment.

FIG. 16 is an illustration of PUSCH resource signaling according to an embodiment.

Referring to FIG. 16, a gNB signals parameters N2, N3, L, O and MsgAPUSCH-FrequencyStart. These parameters may be signaled as part of a two-step RACH configuration in system information or dedicated RRC signaling. These parameters are signaled for each BWP supporting a two-step RACH. Using these parameters, a UE may identify PUSCH resources with respect to each set of FDMed/time division multiplexed (TDMed) PRACH occasions as shown in FIG. 16. The set of PRACH occasions refers to RACH occasions of a PRACH slot. MsgAPUSCH-FrequencyStart indicates a starting PRB of FDMed PUSCH resources in the frequency domain. The starting PRB is indicated with respect to PRB 0 of BWP. N2 is a number of FDMed PUSCH resources. N3 is a number of PRBs in one PUSCH resource. L is a length in symbols and/or slots of a PUSCH resource. O is an offset of PUSCH resource with respect to a PRACH occasion, i.e., with respect to a start or an end of a PRACH slot carrying the PRACH occasion. The offset may be in a unit of symbols or slots. The number of PUSCH resources mapped to one PRACH occasion equals N2/M; for N2>=M; M equals N1*N4 where N1 is a number of FDMed PRACH occasions and N4 is a number of PRACH occasions in one PRACH slot. For N2 less than M, M/N2 PRACH occasions are mapped to one PUSCH resource. In this case, preambles used in PRACH occasions mapped to the same PUSCH resource should be different.

RACH Less Handover or Reconfiguration

In NR TCI, a framework is specified for a beam indication/switch for a PDCCH, a PDSCH and a channel state information reference signal (CSI-RS). One DL RS (SSB or CSI-RS) is RRC configured per TCI state. A UE identifies its beam information based on the DL RS in the indicated TCI state. For PDCCH beam indication, a set of TCI states are RRC configured per CORESET. One TCI state amongst these based on which UE determines the PDCCH beam is indicated by a MAC CE.

In a case of handover, the UE is configured with a list of TCI states for a target cell. The configured TCI states are initially deactivated upon handover. If the UE received an initial configuration of more than one TCI states for PDCCH receptions by a higher layer parameter TCI-Slates but has not received a MAC CE activation command for one of the TCI states, the UE assumes that the DM-RS antenna port associated with PDCCH receptions is quasi co-located with the SS/PBCH block the UE identified during the random access procedure at the target cell.

A RACH-less handover is being discussed to reduce handover latency. In a case of a RACH-less handover, since a UE does not perform random access at the target cell, the UE knows how to receive a PDCCH in the target cell as all TCI states received in a handover command are in a deactivated state.

If a RACH-less handover is indicated in a reconfiguration message, an gNB indicates a single TCI state for a target cell. In a case of a BWP operation, in a DL BWP indicated by a first active DL BWP ID, a gNB configures only a single TCI state if the RACH-less handover is indicated in a reconfiguration message. The UE uses the TCI state information provided by the TCI state to receive a PDCCH in the target cell upon handover. The UE assumes that the DM-RS antenna port associated with PDCCH receptions is quasi co-located with the one or more DL RS configured by the TCI state.

The gNB may configure the single TCI state based on an SSB ID/CSI RS ID of the target cell included in a last measurement report. As a result, the single TCI state provided in a reconfiguration message may not be valid when the UE performs a handover to the target cell. The following may be considered upon handover:

1) If a RACH-less handover is configured and if an SSB ID/CSI RS ID indicated by a TCI state is not suitable, the UE performs random access.

2) If the UE fails to receive any PDCCH for a configurable duration, the UE performs random access.

If a RACH-less handover is indicated in a reconfiguration message, a gNB indicates an activated TCI state (i.e., the gNB signals an activated TCI state ID in a reconfiguration message) amongst a list of TCI states configured for a target cell. In a case of a BWP operation, in a DL BWP indicated by a first active DL BWP ID, the gNB indicates an activated TCI state (i.e., the gNB signals an activated TCI state ID in a reconfiguration message) amongst the list of TCI states configured for the target cell if a RACH-less handover is indicated in the reconfiguration message. A pre-defined (e.g. a first one) TCI state in a list of TCI states is active by default if a RACH-less handover is indicated in a reconfiguration message. The UE uses the TCI state information provided by the activated TCI state to receive a PDCCH in the target cell upon handover. The UE assumes that the DM-RS antenna port associated with PDCCH receptions is quasi co-located with the one or more DL RS configured by the TCI state.

The gNB may indicate an activated TCI state based on an SSB ID/CSI RS ID of a target cell included in a last measurement report. As a result, the activated TCI state provided in a reconfiguration message may not be valid when the UE performs handover to the target cell. The following may be considered upon handover:

1) If a RACH-less handover is configured and if an SSB ID/CSI RS ID indicated by an activated TCI state is not suitable, a UE performs a random access.

2) If the UE fails to receive any PDCCH based on an activated TCI state for a configurable duration, the UE performs a random access.

If a RACH-less handover is indicated in a reconfiguration message and a gNB indicates a list of TCI states for a target cell, a UE assumes that a DM-RS antenna port associated with PDCCH receptions is quasi co-located with an SS/PBCH block or a CSI RS with a highest signal quality which the UE reported for the target cell in a last measurement report.

1) If an SS/PBCH block or an CSI RS with a highest signal quality which the UE reported for the target cell in the last measurement report is not suitable at the time of handover, the UE performs a random access even if a RACH-less handover is indicated in a reconfiguration message.

2) If the UE fails to receive any PDCCH for a configurable duration in a target cell, the UE performs a random access.

Hereinafter, another embodiment of the disclosure, which relates to a method and an apparatus of fallback to random access during a RACH-less handover is described.

In a 5G wireless communication system (also referred as NR), network controlled cell level mobility is supported for UEs in RRC CONNECTED. A typical procedure for cell level mobility is as follows:

1. A source gNB configures a UE measurement procedure and the UE reports according to the measurement configuration.

2. The source gNB decides to handover the UE, based on a MeasurementReport and radio resource management (RRM) information.

3. The source gNB issues a Handover Request message to the target gNB, passing a transparent RRC container with necessary information to prepare the handover at the target side. The information includes at least the target cell ID, KgNB*, the C-RNTI of the UE in the source gNB, RRM-configuration including UE inactive time, basic AS-configuration including antenna Info and DL Carrier Frequency, the current QoS flow to DRB mapping rules applied to the UE, the SIB1 from source gNB, the UE capabilities for different radio access technologies (RATs), packet data unit (PDU) session related information, and may include the UE reported measurement information including beam-related information if available. The PDU session related information includes the slice information (if supported) and QoS flow level QoS profile(s).

4. Admission Control may be performed by the target gNB. Slice-aware admission control shall be performed if the slice information is sent to the target gNB. If the PDU sessions are associated with non-supported slices the target gNB shall reject such PDU Sessions.

5. The target gNB prepares the handover with L1/L2 and sends the HANDOVER REQUEST ACKNOWLEDGE to the source gNB, which includes a transparent container to be sent to the UE as an RRC message to perform the handover.

6. The source gNB triggers the UE handover by sending an RRCReconfiguration message to the UE, containing information required to access the target cell: at least the target cell ID, the new C-RNTI, the target gNB security algorithm identifiers for the selected security algorithms. The RRCReconfiguration message may also include a set of dedicated RACH resources, the association between RACH resources and SSB(s), the association between RACH resources and UE-specific CSI-RS configuration(s), common RACH resources, and system information of the target cell, etc.

7. The source gNB sends the SN STATUS TRANSFER message to the target gNB.

8. The UE synchronizes to the target cell After the DL synchronization, UE performs random access procedure for UL synchronization. UE completes the RRC handover procedure by sending RRCReconfigurationComplete message to target gNB.

9. The target gNB sends a PATH SWITCH REQUEST message to access management function (AMF) to trigger 5G core (5GC) to switch the DL data path towards the target gNB and to establish an NG-C interface instance towards the target gNB.

10. 5GC switches the DL data path towards the target gNB. The UPF sends one or more "end marker" packets on the old path to the source gNB per PDU session/tunnel and then can release any U-plane/tunnel (TNL) resources towards the source gNB.

11. The AMF confirms the PATH SWITCH REQUEST message with the PATH SWITCH REQUEST ACKNOWLEDGE message.

12. Upon reception of the PATH SWITCH REQUEST ACKNOWLEDGE message from the AMF, the target gNB sends the UE CONTEXT RELEASE to inform the source gNB about the success of the handover. The source gNB may then release radio and C-plane related resources associated to the UE context. Any ongoing data forwarding may continue.

In order to reduce handover latency, RACH-less handover is being studied. In a case of RACH-less handover, the UE is not required to perform random access with the target cell. RACH-less handover was supported in the 4G wireless communication system. In the 4G wireless communication system, a handover command (i.e., RRCReconfiguration) indicates whether the UE should skip a random access with a target cell or not. For UL transmission in a target cell, a handover command also indicates whether to apply timing advanced of source cell or TA equals zero. A handover command may optionally provide pre-allocated UL grants for transmitting the RRCReconfigurationComplete and/or UL data. The same procedure may be applied to RACH-less handover in NR. NR supports high frequency bands (>6 GHz), also referred as FR2 frequency bands and the lower frequency bands (<=6 GHz) also referred as FR1 frequency bands. At high frequency, beamforming is essential. In the current handover procedure, initial beam alignment between a UE and a target cell occurs via a random access procedure.

In a case of RACH-less handover, for beam alignment, pre-allocated UL grants signaled in a handover command may be associated with one or more SSB/CSI RS(s). A UE may select an SSB/CSI RS and then transmit in a UL grant corresponding to the selected SSB/CSI RS. A method is needed to select an SSB/CSI RS amongst the SSB/CSI RSs associated with pre-allocated UL grants. A method is needed to handle the scenario when none of the SSB/CSI RSs amongst the SSB/CSI RSs associated with pre-allocated UL grants may be selected.

Fallback Based on Measurement of SS-RSRP/CSI-RSRP of SSB/CSI-RS(s) Associated with the Pre-Allocated UL Grants The various methods in the disclosure to handle the scenario when none of the SSB/CSI RSs amongst the SSB/CSI RSs associated with pre-allocated UL grants may be selected, are described below.

Figure 17:
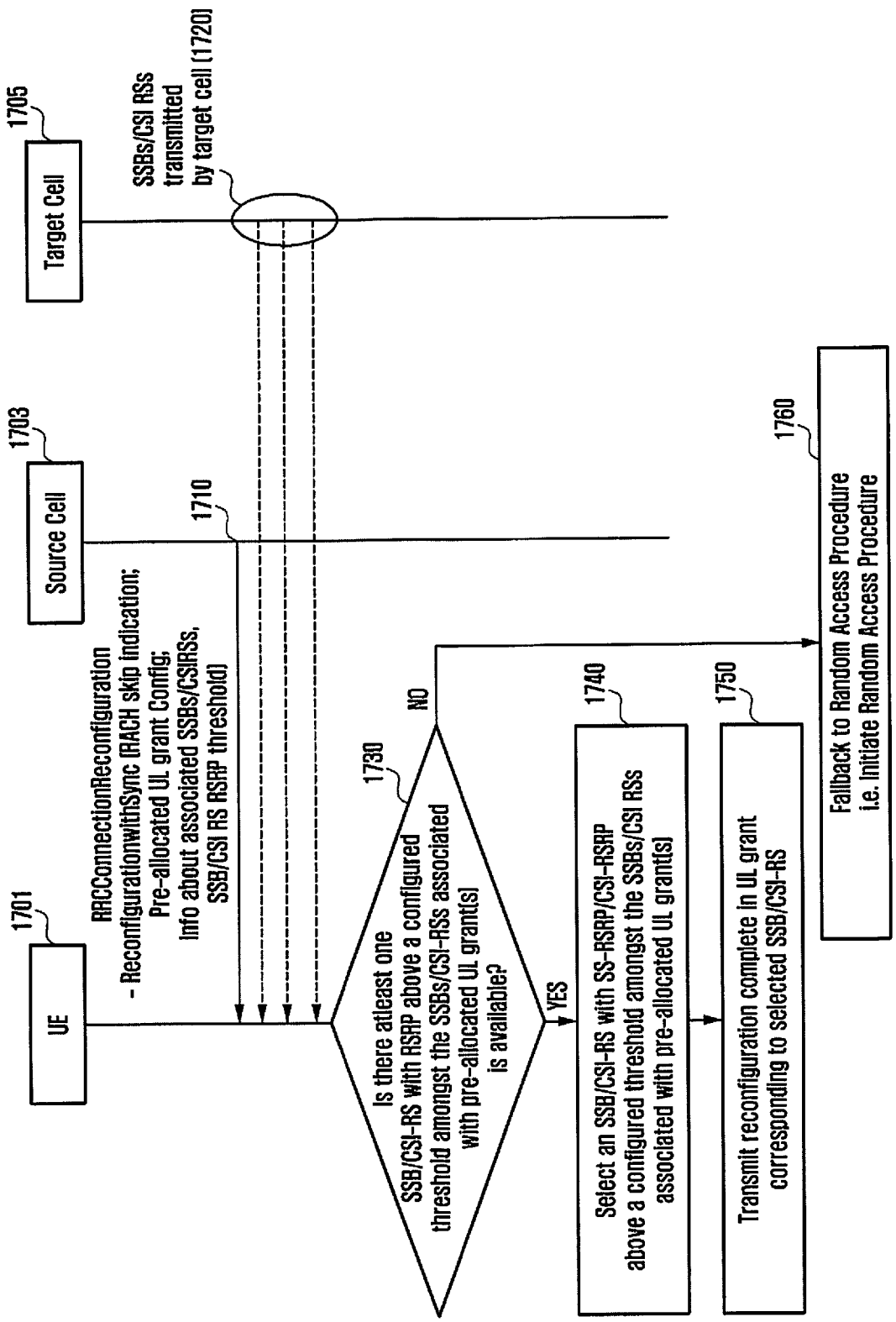
FIG. 17 is a flowchart of a method of handling a fallback to random access during a random access channel less (RACH-less) handover according to an embodiment.

FIG. 17 is a flowchart of a method of handling a fallback to random access during a random access channel less (RACH-less) handover according to an embodiment.

Referring to FIG. 17, a UE 1701 receives an RRCReconfiguration message from a source cell 1703 (e.g., a gNB) in step 1710. spCellConfig in the RRCReconfiguration message includes reconfigurationWithSync. Information (e.g. an indication to skip RACH) in reconfigurationWithSync IE indicates that the UE 1701 shall skip RACH towards a target cell 1705. The RRCReconfiguration message includes a pre-allocated UL grant configuration (parameters indicate periodically occurring UL grants). This configuration is provided for at least a UL BWP indicated by a firstActiveUplinkBWP-Id. The RRCReconfiguration message also includes information (i.e., SSB ID/CSI-RS ID) about an SSB/CSI-RS(s) associated with the pre-allocated UL grants.

The UE 1701 measures the SS-RSRP/CSI-RSRP of SSB/CSI-RS(s) associated with the pre-allocated UL grants in step 1720.

If there is at least one SSB/CSI-RS with SS-RSRP/CSI-RSRP above a configured ss-rsrp-threshold/csi-rsrp-threshold amongst the SSB(s)/CSI RS(s) associated with pre-allocated UL grant(s) that is available, the UE 1701 performs the following operation in step 1730:

UE skip RACH towards the target cell.
  Select an SSB/CSI-RS with SS-RSRP/CSI-RSRP above a configured ss-rsrp-threshold/csi-rsrp-threshold amongst the SSB(s)/CSI RS(s) associated with pre-allocated UL grant(s) (1740).
    If multiple SSBs/CSI-RSs with SS-RSRP/CSI-RSRP above a configured ss-rsrp-threshold/csi-rsrp-threshold are available, UE select any one or UE select the SSB/CSI RS whose associated UL grant is available first (in time domain).
  Transmit ReconfigurationComplete in UL grant (amongst the pre-allocated UL grants) corresponding to selected SSB/CSI-RS (1750).

If there is not any SSB/CSI-RS with an SS-RSRP/CSI-RSRP above a configured ss-rsrp-threshold/csi-rsrp-threshold amongst the SSB(s)/CSI RS(s) associated with the pre-allocated UL grant(s), the UE 1701 performs the following operation in step 1730:

UE fallbacks to random access procedure i.e. it initiates random access procedure (1760).
  ReconfigurationComplete is transmitted in UL grant received in RAR.

The ss-rsrp-threshold/csi-rsrp-threshold is signaled by the gNB 1703 in an RRCReconfiguration message. The ss-rsrp-threshold is configured if a UL grant(s) in a pre-allocated UL grant configuration is associated with SSBs. The csi-rsrp-threshold is configured if a UL grant(s) in a pre-allocated UL grant configuration is associated with a CSI-RS(s). The ss-rsrp-threshold is configured in a RACH configuration.

The UE 1701 receives an RRCReconfiguration message from the gNB 1703 in step 1710. spCellConfig in the RRCReconfiguration message includes reconfigurationWithSync. Information (e.g. an indication to skip RACH) in reconfigurationWithSync IE indicates that the UE 1701 shall skip RACH towards the target cell 1705. The RRCReconfiguration message includes a pre-allocated UL grant configuration (parameters indicating periodically occurring UL grants). This configuration is provided for at least a UL BWP indicated by firstActiveUplinkBWP-Id. The RRCReconfiguration message also includes information (i.e., SSB ID/CSI-RS ID) about the SSB/CSI-RS(s) associated with the pre-allocated UL grants.

The UE 1701 measures the SS-RSRP/CSI-RSRP of SSB/CSI-RS(s) associated with the pre-allocated UL grants in step 1720.

If there is at least one SSB/CSI-RS with an SS-RSRP/CSI-RSRP above a configured ss-rsrp-threshold/csi-rsrp-threshold amongst the SSB(s)/CSI RS(s) associated with the pre-allocated UL grant(s) that is available, the UE 1701 performs the following operation in 1730:

UE skip RACH towards the target cell
  Select an SSB/CSI-RS with SS-RSRP/CSI-RSRP above a configured ss-rsrp-threshold/csi-rsrp-threshold amongst the SSB(s)/CSI RS(s) associated with pre-allocated UL grant(s) (1740).
    If multiple SSBs/CSI-RSs with SS-RSRP/CSI-RSRP above a configured ss-rsrp-threshold/csi-rsrp-threshold are available, UE select any one or UE select the SSB/CSI RS whose associated UL grant is available first (in time domain).
  Transmit ReconfigurationComplete in UL grant (amongst the pre-allocated UL grants) corresponding to selected SSB/CSI-RS (1750).

If there is not any SSB/CSI-RS with an SS-RSRP/CSI-RSRP above a configured ss-rsrp-threshold/csi-rsrp-threshold amongst the SSB(s)/CSI RS(s) associated with the pre-allocated UL grant(s), the UE 1701 performs the following operation in step 1730:

If fallback Indication is set to TRUE in RRCReconfiguration message, UE fallbacks to random access procedure i.e. it initiates random access procedure (1760).
  ReconfigurationComplete is transmitted in UL grant received in RAR.
Else:
Select any SSB/CSI-RS amongst the SSB(s)/CSI RS(s) associated with pre-allocated UL grant(s).

Transmit ReconfigurationComplete in UL grant (amongst the pre-allocated UL grants) corresponding to selected SSB/CSI-RS.

The ss-rsrp-threshold/csi-rsrp-threshold is signaled by the gNB 1703 in the RRCReconfiguration message. The ss-rsrp-threshold is configured if a UL grant(s) in a pre-allocated UL grant configuration is associated with SSBs. The csi-rsrp-threshold is configured if a UL grant(s) in a pre-allocated UL grant configuration is associated with a CSI-RS(s). The ss-rsrp-threshold may be configured in a RACH configuration.

The UE 1701 receives an RRCReconfiguration message from the gNB 1703 in step 1710. spCellConfig in the RRCReconfiguration message includes reconfigurationWithSync. Information (e.g. an indication to skip RACH) in reconfigurationWithSync IE indicates that the UE 1701 shall skip RACH towards the target cell 1705. The RRCReconfiguration message includes a pre-allocated UL grant configuration (parameters indicating periodically occurring UL grants). This configuration is provided for at least a UL BWP indicated by firstActiveUplinkBWP-Id. The RRCReconfiguration message also includes information (i.e., an SSB ID/CSI-RS ID) about the SSB/CSI-RS(s) associated with the pre-allocated UL grants.

The UE 1701 measures the SS-RSRP/CSI-RSRP of SSB/CSI-RS(s) associated with the pre-allocated UL grants in step 1720.

If there is at least one SSB/CSI-RS with an SS-RSRP/CSI-RSRP above a configured ss-rsrp-threshold/csi-rsrp-threshold amongst the SSB(s)/CSI RS(s) associated with the pre-allocated UL grant(s) that is available, the UE 1701 performs the following operation in step 1730:

UE skip RACH towards the target cell
- Select an SSB/CSI-RS with SS-RSRP/CST-RSRP above a configured ss-rsrp-threshold/csi-rsrp-threshold amongst the SSB(s)/CSI RS(s) associated with pre-allocated UL grant(s) (1740).
  - If multiple SSBs/CSI-RSs with SS-RSRP/CSI-RSRP above a configured ss-rsrp-threshold/csi-rsrp-threshold are available, UE select any one or UE select the SSB/CSI RS whose associated UL grant is available first (in time domain).
- Transmit ReconfigurationComplete in UL grant (amongst the pre-allocated UL grants) corresponding to selected SSB/CSI-RS (1750).

If there is not any SSB/CSI-RS with an SS-RSRP/CST-RSRP above a configured ss-rsrp-threshold/csi-rsrp-threshold amongst the SSB(s)/CSI RS(s) associated with the pre-allocated UL grant(s), the UE 1701 performs the following operation in step 1730:

If number of SSBs/CSI-RSs associated with pre-allocated UL grant is less than the maximum SSBs/CSIRSs supported in target cell, UE fallbacks to random access procedure i.e. it initiates random access procedure. ReconfigurationComplete is transmitted in UL grant received in RAR.

Else:
- Select any SSB/CSI-RS amongst the SSB(s)/CSI RS(s) associated with pre-allocated UL grant(s).
- Transmit ReconfigurationComplete in UL grant (amongst the pre-allocated UL grants) corresponding to selected SSB/CSI-RS (1760).

The ss-rsrp-threshold/csi-rsrp-threshold is signaled by the gNB 1703 in RRCReconfiguration message. The ss-rsrp-threshold is configured if the UL grant(s) in the pre-allocated UL grant configuration are associated with the SSBs. The csi-rsrp-threshold is configured if the UL grant(s) in the pre-allocated UL grant configuration are associated with the CSI-RS(s). The ss-rsrp-threshold may be configured in a RACH configuration.

Figure 18:
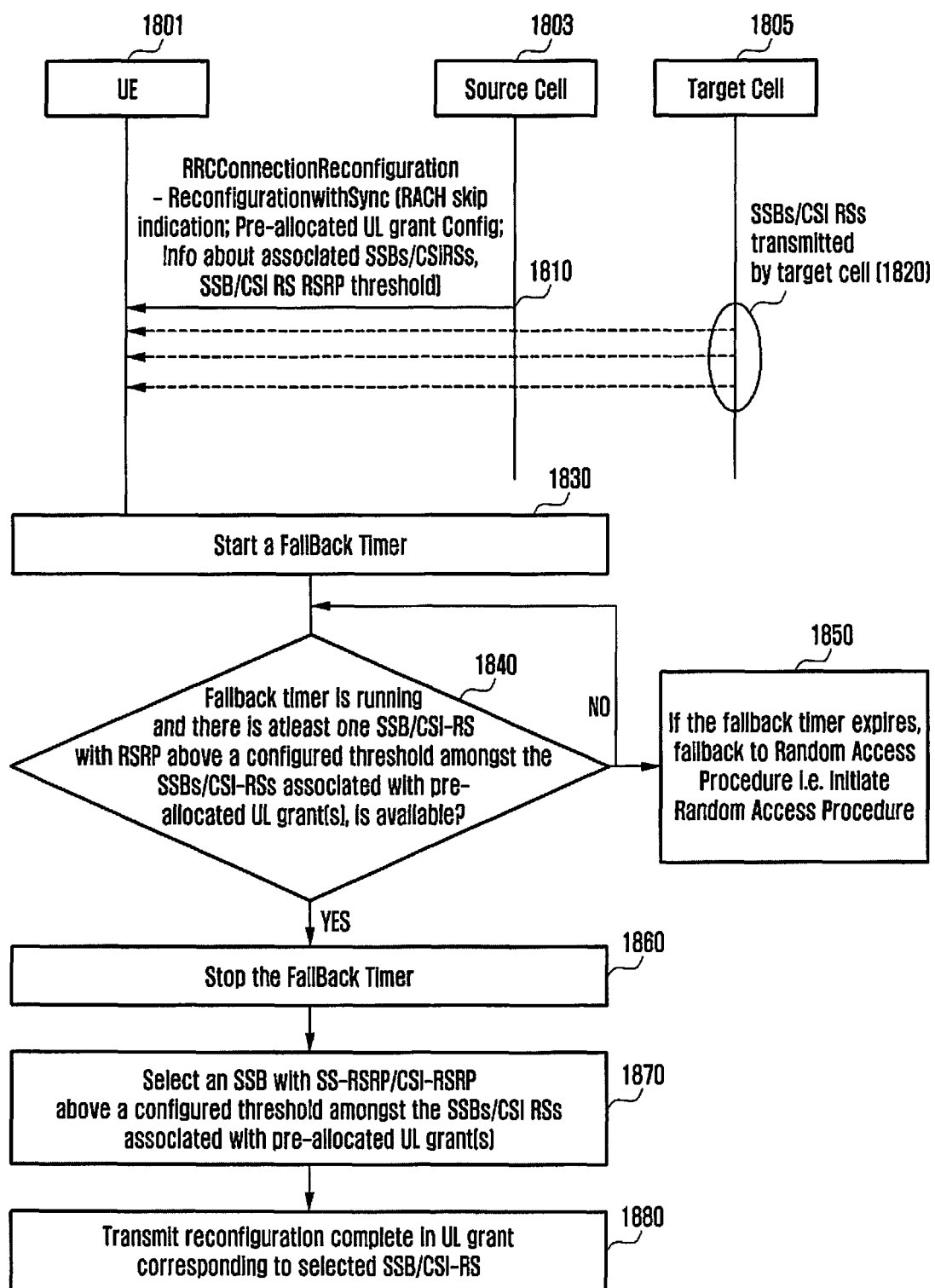
FIG. 18 is a flowchart of a method of handling a fallback to random access during a RACH-less handover according to an embodiment.

FIG. 18 is a flowchart of a method of handling a fallback to random access during a random access channel less (RACH-less) handover according to an embodiment.

Referring to FIG. 18, the UE 1801 receives an RRCReconfiguration message from a source cell 1803 (e.g. a gNB) in step 1810. spCellConfig in the RRCReconfiguration message includes reconfigurationWithSync. Information (e.g. an indication to skip RACH) in reconfigurationWithSync IE indicates that the UE 1801 shall skip RACH towards the target cell 1805. The RRCReconfiguration message includes a pre-allocated UL grant configuration (parameters indicate periodically occurring UL grants). This configuration is provided for at least a UL BWP indicated by firstActiveUplinkBWP-Id. The RRCReconfiguration message also includes information (i.e., an SSB ID/CSI-RS ID) about the SSB/CSI-RS(s) associated with the pre-allocated UL grants in step 1820.

The UE 1801 starts the fallback timer in step 1830.

The UE 1801 measures the SS-RSRP/CSI-RSRP of SSB/CSI-RS(s) associated with the pre-allocated UL grants.

If the fallback timer is running and there is at least one SSB/CSI-RS with an SS-RSRP/CSI-RSRP above a configured ss-rsrp-threshold/csi-rsrp-threshold amongst the SSB(s)/CSI RS(s) associated with pre-allocated UL grant(s) that is available, the UE 1801 performs the following operation in step 1840:

- UE stops the fallback timer (1860).
- UE skip RACH towards the target cell.
  - Select an SSB/CSI-RS with SS-RSRP/CSI-RSRP above a configured ss-rsrp-threshold/csi-rsrp-threshold amongst the SSB(s)/CSI RS(s) associated with pre-allocated UL grant(s) (1870).
    - If multiple SSBs/CSI-RSs with SS-RSRP/CSI-RSRP above a configured ss-rsrp-threshold/csi-rsrp-threshold are available, UE select any one or UE select the SSB/CSI RS whose associated UL grant is available first (in time domain).
  - Transmit ReconfigurationComplete in UL grant (amongst the pre-allocated UL grants) corresponding to selected SSB/CSI-RS (1880).

Measurement and comparison of measurements with threshold may be performed periodically until the fallback timer expires or the UE 1801 is able to select an SSB/CSI-RS above the threshold.

If the fallback timer expires, the UE 1801 fallbacks to a random access procedure, i.e., the UE 1801 initiates a random access procedure. ReconfigurationComplete is transmitted in the UL grant received in an RAR in step 1850.

The ss-rsrp-threshold/csi-rsrp-threshold is signaled by the gNB 1803 in the RRCReconfiguration message. The ss-rsrp-threshold is configured if the UL grant(s) in the pre-allocated UL grant configuration are associated with SSBs. The csi-rsrp-threshold is configured if the UL grant(s) in the pre-allocated UL grant configuration are associated with a CSI-RS(s). The ss-rsrp-threshold may be configured in a RACH configuration.

Fallback timer duration is signaled by the gNB 1803 in the RRCReconfiguration message. The fallback timer duration may be pre-defined.

The UE 1801 receives the RRCReconfiguration message from the gNB 1803 in step 1810. spCellConfrg in the RRCReconfiguration message includes reconfigurationWithSync. Information (e.g. an indication to skip RACH) in reconfigurationWithSync IE indicates that the UE 1801 shall skip RACH towards the target cell 1805. The RRCReconfiguration message includes a pre-allocated UL grant configuration (parameters indicate periodically occurring UL grants). This configuration is provided for at least a UL BWP indicated by firstActiveUplinkBWP-Id. The RRCReconfiguration message also includes information (i.e., an SSB ID/CSI-RS ID) about an SSB/CSI-RS(s) associated with the pre-allocated UL grants in step 1820.

If the fallback timer is configured in the RRCReconfiguration message, the UE 1801 starts the fallback timer in step 1830.

The UE 1801 measures the SS-RSRP/CSI-RSRP of an SSB/CSI-RS(s) associated with the pre-allocated UL grants.

If the fallback timer is not configured in the RRCReconfiguration message and if there is at least one SSB/CSI-RS with an SS-RSRP/CSI-RSRP above a configured ss-rsrp-threshold/csi-rsrp-threshold amongst the SSB(s)/CSI RS(s) associated with the pre-allocated UL grant(s) that is available, the UE 1801 performs the following operation in step 1840:
   UE skip RACH towards the target cell.
      Select an SSB/CSI-RS with SS-RSRP/CSI-RSRP above a configured ss-rsrp-threshold/csi-rsrp-threshold amongst the SSB(s)/CSI RS(s) associated with pre-allocated UL grant(s) (1870).
         If multiple SSBs/CSI-RSs with SS-RSRP/CSI-RSRP above a configured ss-rsrp-threshold/csi-rsrp-threshold are available, UE select any one or UE select the SSB/CSI RS whose associated UL grant is available first (in time domain).
      Transmit ReconfigurationComplete in UL grant (amongst the pre-allocated UL grants) corresponding to selected SSB/CSI-RS (1880).

If there isn't any SSB/CSI-RS with SS-RSRP/CSI-RSRP above a configured ss-rsrp-threshold/csi-rsrp-threshold, amongst the SSB(s)/CSI RS(s) associated with pre-allocated UL grant(s), UE performs the following operation:
   UE fallbacks to random access procedure i.e. it initiates random access procedure (1850).
      ReconfigurationComplete is transmitted in UL grant received in RAR.

Else, if the fallback timer is configured in the RRCReconfiguration message:
   If fallback timer is running and if there is at least one SSB/CSI-RS with SS-RSRP/CSI-RSRP above a configured ss-rsrp-threshold/csi-rsrp-threshold, amongst the SSB(s)/CSI RS(s) associated with pre-allocated UL grant(s), is available, UE performs the following operation (1840):
      UE stops the fallback timer (1860).
      UE skip RACH towards the target cell.
         Select an SSB/CSI-RS with SS-RSRP/CSI-RSRP above a configured ss-rsrp-threshold/csi-rsrp-threshold amongst the SSB(s)/CSI RS(s) associated with pre-allocated UL grant(s) (1870).
           If multiple SSBs/CSI-RSs with SS-RSRP/CSI-RSRP above a configured ss-rsrp-threshold/csi-rsrp-threshold are available, UE select any one or UE select the SSB/CSI RS whose associated UL grant is available first (in time domain).
         Transmit ReconfigurationComplete in UL grant (amongst the pre-allocated UL grants) corresponding to selected SSB/CSI-RS (1880).

Measurement and comparison of measurements with threshold can be performed periodically until fallback timer expires or UE is able to select a SSB/CSI-RS above threshold.

If fallback timer expires, UE fallbacks to random access procedure i.e. it initiates random access procedure. ReconfigurationComplete is transmitted in UL grant received in RAR (1850).

The ss-rsrp-threshold/csi-rsrp-threshold is configured as signaled by the gNB 1803 in the RRCReconfiguration message. The ss-rsrp-threshold is configured if the UL grant(s) in the pre-allocated UL grant configuration is associated with SSBs. The csi-rsrp-threshold is configured if the UL grant(s) in the pre-allocated UL grant configuration is associated with a CSI-RS(s). The ss-rsrp-threshold may be configured in a RACH configuration.

The UE 1801 receives a RRCReconfiguration message from the gNB 1803. spCellConfig in the RRCReconfiguration message includes reconfigurationWithSync. Information (e.g., an indication to skip RACH) in reconfgurationWithSync IE indicates that the UE 1801 shall skip RACH towards the target cell 1805. The RRCReconfiguration message includes a pre-allocated UL grant configuration (parameters indicating periodically occurring UL grants). This configuration is provided for at least a UL BWP indicated by firstActiveUplinkBWP-Id. The RRCReconfiguration message also includes information (i.e., an SSB ID/CSI-RS ID) about the SSB/CSI-RS(s) associated with the pre-allocated UL grants.

If a fallback timer is configured in the RRCReconfiguration message, the UE 1801 starts the fallback timer.

The UE 1801 measures the SS-RSRP/CSI-RSRP of an SSB/CSI-RS(s) associated with the pre-allocated UL grants.

If there is at least one SSB/CSI-RS with SS-RSRP/CSI-RSRP above a configured ss-rsrp-threshold/csi-rsrp-threshold, amongst the SSB(s)/CSI RS(s) associated with pre-allocated UL grant(s), is available, UE performs the following operation:
   UE skip RACH towards the target cell
      Select an SSB/CSI-RS with SS-RSRP/CSI-RSRP above a configured ss-rsrp-threshold/csi-rsrp-threshold amongst the SSB(s)/CSI RS(s) associated with pre-allocated UL grant(s).
         If multiple SSBs/CSI-RSs with SS-RSRP/CSI-RSRP above a configured ss-rsrp-threshold/csi-rsrp-threshold are available, UE select any one or UE select the SSB/CSI RS whose associated UL grant is available first (in time domain).
      Transmit ReconfigurationComplete in UL grant (amongst the pre-allocated UL grants) corresponding to selected SSB/CSI-RS.

If there isn't any SSB/CSI-RS with SS-RSRP/CSI-RSRP above a configured ss-rsrp-threshold/csi-rsrp-threshold, amongst the SSB(s)/CSI RS(s) associated with pre-allocated UL grant(s), UE performs the following operation:
   If fallback indication is set to TRUE in RRCReconfiguration message, UE fallbacks to random access procedure i.e. it initiates random access procedure.
      ReconfigurationComplete is transmitted in UL grant received in RAR.
Else:
   Select any SSB/CSI-RS amongst the SSB(s)/CSI RS(s) associated with pre-allocated UL grant(s).
   Transmit ReconfigurationComplete in UL grant (amongst the pre-allocated UL grants) corresponding to selected SSB/CSI-RS.

else if fallback timer is configured in RRCReconfiguration message:
  If fallback timer is running and if there is at least one SSB/CSI-RS with SS-RSRP/CSI-RSRP above a configured ss-rsrp-threshold/csi-rsrp-threshold, amongst the SSB(s)/CSI RS(s) associated with pre-allocated UL grant(s), is available, UE performs the following operation:
    UE stops the fallback timer
    UE skip RACH towards the target cell
      Select an SSB/CSI-RS with SS-RSRP/CSI-RSRP above a configured ss-rsrp-threshold/csi-rsrp-threshold amongst the SSB(s)/CSI RS(s) associated with pre-allocated UL grant(s).
        If multiple SSBs/CSI-RSs with SS-RSRP/CSI-RSRP above a configured ss-rsrp-threshold/csi-rsrp-threshold are available, UE select any one or UE select the SSB/CSI RS whose associated UL grant is available first (in time domain).
        Transmit ReconfigurationComplete in UL grant (amongst the pre-allocated UL grants) corresponding to selected SSB/CSI-RS.
  Measurement and comparison of measurements with threshold can be performed periodically until fallback timer expires or UE is able to select a SSB/CSI-RS above threshold.
  If fallback timer expires, UE fallbacks to random access procedure i.e. it initiates random access procedure. ReconfigurationComplete is transmitted in UL grant received in RAR.

The ss-rsrp-threshold/csi-rsrp-threshold is configured as signaled by the gNB 1803 in the RRCReconfiguration message. The ss-rsrp-threshold is configured if the UL grant(s) in the pre-allocated UL grant configuration are associated with SSBs. The csi-rsrp-threshold is configured if the UL grant(s) in the pre-allocated UL grant configuration are associated with a CSI-RS(s). The ss-rsrp-threshold may be configured in a RACH configuration.

The UE 1801 receives an RRCReconfiguration message from the gNB 1803. spCellConfig in the RRCReconfiguration message includes reconfigurationWithSync. Information (e.g., an indication to skip RACH) in reconfigurationWithSync IE indicates that the UE 1801 shall skip RACH towards the target cell 1805. The RRCReconfiguration message includes a pre-allocated UL grant configuration (parameters indicate periodically occurring UL grants). This configuration is provided for at least a UL BWP indicated by firstActiveUplinkBWP-Id. The RRCReconfiguration message also includes information (i.e., an SSB ID/CSI-RS ID) about the SSB/CSI-RS(s) associated with the pre-allocated UL grants.

If the fallback timer is configured in the RRCReconfiguration message, the UE 1801 starts the fallback timer.

The UE 1801 measures the SS-RSRP/CSI-RSRP of an SSB/CSI-RS(s) associated with the pre-allocated UL grants.

If fallback timer is not configured in the RRCReconfiguration message:
  If there is at least one SSB/CSI-RS with SS-RSRP/CSI-RSRP above a configured ss-rsrp-threshold/csi-rsrp-threshold, amongst the SSB(s)/CSI RS(s) associated with pre-allocated UL grant(s), is available, UE performs the following operation:
    UE skip RACH towards the target cell
      Select an SSB/CSI-RS with SS-RSRP/CSI-RSRP above a configured ss-rsrp-threshold/csi-rsrp-threshold amongst the SSB(s)/CSI RS(s) associated with pre-allocated UL grant(s).
        If multiple SSBs/CSI-RSs with SS-RSRP/CSI-RSRP above a configured ss-rsrp-threshold/csi-rsrp-threshold are available, UE select any one or UE select the SSB/CSI RS whose associated UL grant is available first (in time domain).
        Transmit ReconfigurationComplete in UL grant (amongst the pre-allocated UL grants) corresponding to selected SSB/CSI-RS.
  If there isn't any SSB/CSI-RS with SS-RSRP/CST-RSRP above a configured ss-rsrp-threshold/csi-rsrp-threshold, amongst the SSB(s)/CSI RS(s) associated with pre-allocated UL grant(s), UE performs the following operation:
    If number of SSBs/CSIRSs associated with pre-allocated UL grant is less than the maximum SSBs/CSIRSs supported in target cell, UE fallbacks to random access procedure i.e. it initiates random access procedure.
    ReconfigurationComplete is transmitted in UL grant received in RAR.
  Else:
    Select any SSB/CSI-RS amongst the SSB(s)/CSI RS(s) associated with pre-allocated UL grant(s).
    Transmit ReconfigurationComplete in UL grant (amongst the pre-allocated UL grants) corresponding to selected SSB/CSI-RS.
else if fallback timer is configured in RRCReconfiguration message:
  If fallback timer is running and if there is at least one SSB/CSI-RS with SS-RSRP/CSI-RSRP above a configured ss-rsrp-threshold/csi-rsrp-threshold, amongst the SSB(s)/CSI RS(s) associated with pre-allocated UL grant(s), is available, UE performs the following operation:
    UE stops the fallback timer
    UE skip RACH towards the target cell
      Select an SSB/CSI-RS with SS-RSRP/CSI-RSRP above a configured ss-rsrp-threshold/csi-rsrp-threshold amongst the SSB(s)/CSI RS(s) associated with pre-allocated UL grant(s).
        If multiple SSBs/CSI-RSs with SS-RSRP/CSI-RSRP above a configured ss-rsrp-threshold/csi-rsrp-threshold are available, UE select any one or UE select the SSB/CSI RS whose associated UL grant is available first (in time domain).
        Transmit ReconfigurationComplete in UL grant (amongst the pre-allocated UL grants) corresponding to selected SSB/CSI-RS.
  Measurement and comparison of measurements with threshold can be performed periodically until fallback timer expires or UE is able to select a SSB/CSI-RS above threshold.
  If fallback timer expires, UE fallbacks to random access procedure i.e. it initiates random access procedure. ReconfigurationComplete is transmitted in UL grant received in RAR.

The ss-rsrp-threshold/csi-rsrp-threshold is configured as signaled by the gNB 1803 in the RRCReconfiguration message. The ss-rsrp-threshold is configured if the UL grant(s) in the pre-allocated UL grant configuration is associated with SSBs. The csi-rsrp-threshold is configured if the UL grant(s) in the pre-allocated UL grant configuration is associated with a CSI-RS(s). The ss-rsrp-threshold may be configured in a RACH configuration.

Fallback Based on TAT Timer

Figure 19:
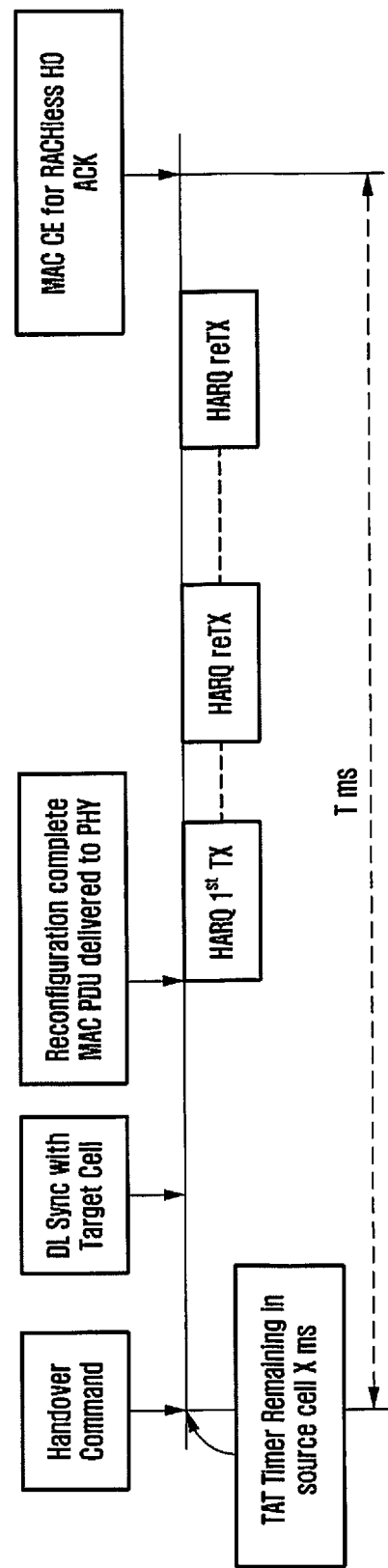
FIG. 19 is an illustration of handling a fallback to random access during a RACH-less handover according to an embodiment.

FIG. 19 is an illustration of handling a fallback to random access during a random access channel less (RACH-less) handover according to an embodiment of the disclosure.

Referring to FIG. 19, a handover command indicates a RACH-less handover. The handover command indicates to use TA of a source cell for UL transmission in a target cell. A TAT timer remaining in the source cell at the time the handover command is received is X ms (e.g. 10 ms). The TA of the source cell may become invalid during handover execution if RACH-less handover is not completed within X ms. If T is greater than X, the TA value will become invalid.

Various methods of overcoming the above-mentioned issue are described below:

A UE receives an RRCReconfiguration message from a gNB. spCellConfig in the RRCReconfiguration message includes reconfigurationWithSync. Information (e.g. an indication to skip RACH) in reconfigurationWithSync IE indicates that the UE shall skip RACH towards the target cell. The information also indicates that the target timing advance (i.e., a targetTA) (i.e., a TA of a primary timing advance group (PTAG) or a secondary timing advance group (STAG) in the source gNB), that the UE should use for a UL transmission in the PTAG at the target gNB. The RRCReconfiguration message includes a pre-allocated UL grant configuration (parameters indicate periodically occurring UL grants). This configuration is provided for at least a UL BWP indicated by firstActiveUplinkBWP-Id.

The UE initializes the TAT timer of the PTAG to a remaining value of TAT timer of the targetTA.

The UE starts using the targetTA (i.e., the TA of the PTAG or the STAG in the source gNB) for the UL transmission in the target cell.

If the TAT timer expires and if the RACH-less handover is not completed (e.g., the UE has not received the MAC CE indicating confirmation of completion of the RACH-less handover):

The UE falls back to a random access procedure i.e., the UE initiates a random access procedure.

Alternatively, if the TAT timer expires and if transmission on the pre-allocated UL grant is not yet successful, the UE falls back to random access procedure, i.e., initiates random access procedure.

The UE receives the RRCReconfiguration message from the gNB. spCellConfig in the RRCReconfiguration message includes reconfigurationWithSync. Information (e.g. an indication to skip RACH) in reconfigurationWithSync IE indicates that the UE shall skip RACH towards the target cell. The information also indicates the targetTA (i.e., the TA of the PTAG or the STAG in the source gNB) that the UE should use for a UL transmission in that PTAG at the target gNB. The RRCReconfiguration message includes pre-allocated UL grant configuration (parameters indicate periodically occurring UL grants). This configuration is provided for at least a UL BWP indicated by firstActiveUplinkBWP-Id.

The UE starts a fallback timer. The fallback timer is set to the remaining value of the TAT timer of the targetTA.

The UE starts the timeAlignmentTimer associated with the PTAG.

The UE starts using the targetTA (i.e., the TA of the PTAG or the STAG in the source gNB) for the UL transmission in the target cell.

If the fallback timer expires and if the RACH-less handover is not completed (e.g., the UE has not received the MAC CE indicating confirmation of completion of the RACH-less handover):

the UE falls back to a random access procedure, i.e., initiates random access procedure Alternatively, if the fallback timer expires and if transmission on the pre-allocated UL grant is not yet successful, the UE falls back to random access procedure i.e., the UE initiates a random access procedure.

The UL grant may either be pre-configured in the RRCReconfiguration message or if not pre-configured then provided on the PDCCH in the target cell.

Regardless of the option used by the network to provide a UL grant, the validity of the UL grant may be based on a timer (specified in number of radio frames) provided in RRCReconfiguration message.

If such a timer is configured, then the start of the timer at the UE is a system frame number (SFN) in which it receives the RRCReconfiguration message.

The UE shall fallback to random access on a target gNB:
a. If transmission on pre-configured UL grants is not successful until expiration of the TAT (if running) having reference to any serving cell of the source gNB or expiration of the UL grant validity timer if configured (whichever expires first), or
b. If none of the gNB beams (SSBs/CSI RSs) associated with pre-allocated UL grants are suitable.

If the UE fallbacks to random access on the target gNB, then CBRA on the target gNB continue until expiration of T304.

If a validity timer is not configured in the RRCReconfiguration message then pre-configured UL grants are valid until expiration of T304

Figure 20:
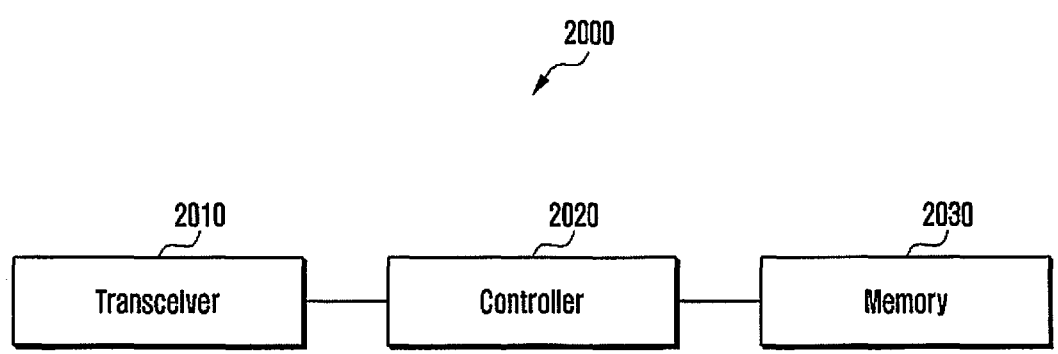
FIG. 20 is a block diagram of a terminal according to an embodiment.

FIG. 20 is a block diagram of a terminal 2000 according to an embodiment.

Referring to FIG. 20, the terminal 2000 includes a transceiver 2010, a controller 2020 and a memory 2030. The controller 2020 may refer to circuitry, an ASIC, or at least one processor. The transceiver 2010, the controller 2020 and the memory 2030 are configured to perform the operations of the UE illustrated in FIGS. 1 to 19, or described above. Although the transceiver 2010, the controller 2020 and the memory 2030 are shown as separate entities, they may be realized as a single entity like a single integrated circuit or chip. The transceiver 2010, the controller 2020 and the memory 2030 may be electrically connected to or coupled with each other.

The transceiver 2010 may transmit and receive signals to and from other network entities, e.g., a base station.

The controller 2020 may control the UE to perform functions according to one of the embodiments described above. The operations of the terminal 2000 may be implemented using the memory 2030 storing corresponding program code. Specifically, the terminal 2000 may be equipped with the memory 2030 to store program code implementing desired operations. To perform the desired operations, the controller 2020 may read and execute the program code stored in the memory 2030 by using a processor or a central processing unit (CPU). Alternatively, the controller 2020 may be implemented as at least one processor.

Figure 21:
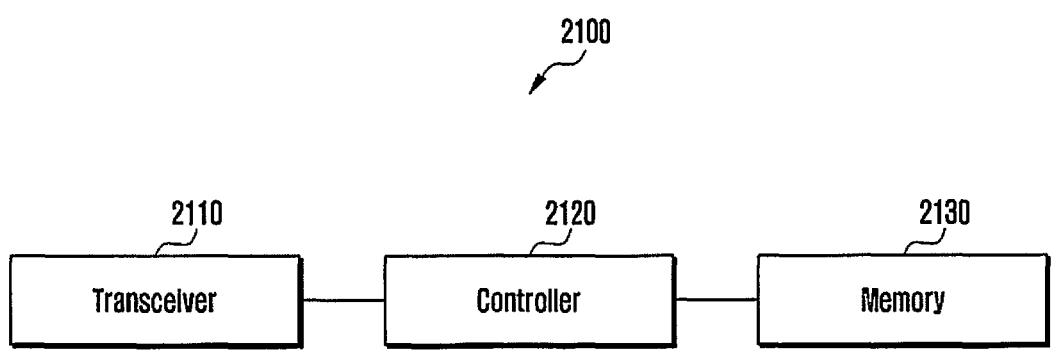
FIG. 21 is a block diagram of a base station according to an embodiment.

FIG. 21 is a block diagram of a base station 2100 according to an embodiment.

Referring to FIG. 21, the base station 2100 includes a transceiver 2110, a controller 2120 and a memory 2130. The transceiver 2110, the controller 2120 and the memory 2130 are configured to perform the operations of the network (e.g., an gNB) illustrated in FIGS. 1 to 19, or described above. Although the transceiver 2110, the controller 2120 and the memory 2130 are shown as separate entities, they may be realized as a single entity like a single chip. The transceiver 2110, the controller 2120 and the memory 2130 may be electrically connected to or coupled with each other.

The transceiver 2110 may transmit and receive signals to and from other network entities, e.g., a terminal. The controller 2120 may control the base station 2100 to perform functions according to one of the embodiments described above. The controller 2120 may refer to circuitry, an ASIC, or at least one processor. The operations of the base station 2100 may be implemented using the memory 2130 storing corresponding program code. Specifically, the base station 2100 may be equipped with the memory 2130 to store program code implementing desired operations. To perform the desired operations, the controller 2120 may read and execute the program code stored in the memory 2130 by using a processor or a CPU. Alternatively, the controller 2120 may be implemented as at least one processor.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
   receiving a radio resource control (RRC) message including first information configuring a random access channel less (RACH-less) handover for a target cell and second information on one or more transmission configuration indicator (TCI) states for the target cell; and
   receiving, from a base station, upon the RACH-less handover, a physical downlink control channel (PDCCH) on the target cell based on a first TCI state among the one or more TCI states,
   wherein a demodulation reference signal (DMRS) antenna port associated with the PDCCH is quasi co-located with a synchronization signal block (SSB) or a channel state information reference signal (CSI-RS) corresponding to the first TCI state.

2. The method of claim 1, wherein the second information indicates a single TCI state for the target cell, and the first TCI state is the single TCI state indicated by the second information.

3. The method of claim 1, wherein the RRC message further includes third information on an active TCI state identifier for the target cell, and the first TCI state corresponds to the active TCI state identifier.

4. The method of claim 1, wherein the second information indicates a plurality of TCI states for the target cell, and the first TCI state is a TCI state for which a highest signal quality is reported in a last measurement report among the plurality of TCI states.

5. The method of claim 1, wherein a random access procedure is performed for the base station, in case that the first TCI state is not suitable at the time of the RACH-less handover, or in case that a reception of the PDCCH based on the first TCI state fails for a duration.

6. A method performed by a base station in a wireless communication system, the method comprising:
   transmitting, to a terminal, upon a random access channel less (RACH-less) handover, a physical downlink control channel (PDCCH) based on a first transmission configuration indicator (TCI) state among one or more TCI states,
   wherein a demodulation reference signal (DMRS) antenna port associated with the PDCCH is quasi co-located with a synchronization signal block (SSB) or a channel state information reference signal (CSI-RS) corresponding to the first TCI state,
   wherein a transmission of the PDCCH is based on a radio resource control (RRC) message including first information configuring the RACH-less handover for a target cell and second information on the one or more TCI states for the target cell.

7. The method of claim 6, wherein the second information indicates a single TCI state for the target cell, and the first TCI state is the single TCI state indicated by the second information.

8. The method of claim 6, wherein the RRC message further includes third information on an active TCI state identifier for the target cell, and the first TCI state corresponds to the active TCI state identifier.

9. The method of claim 6, wherein the second information indicates a plurality of TCI states for the target cell, and the first TCI state is a TCI state for which a highest signal quality is reported in a last measurement report among the plurality of TCI states.

10. The method of claim 6, wherein a random access procedure is performed with the terminal, in case that the first TCI state is not suitable at the time of the RACH-less handover, or in case that the transmission of the PDCCH based on the first TCI state fails for a duration.

11. A terminal in a wireless communication system, the terminal comprising:
    a transceiver; and
    a controller configured to:
      receive, via the transceiver, a radio resource control (RRC) message including first information configuring a random access channel less (RACH-less) handover for a target cell and second information on one or more transmission configuration indicator (TCI) states for the target cell, and
      receive, from a base station, via the transceiver, upon the RACH-less handover, a physical downlink control channel (PDCCH) on the target cell based on a first TCI state among the one or more TCI states,
    wherein a demodulation reference signal (DMRS) antenna port associated with the PDCCH is quasi co-located with a synchronization signal block (SSB) or a channel state information reference signal (CSI-RS) corresponding to the first TCI state.

12. The terminal of claim 11, wherein the second information indicates a single TCI state for the target cell, and the first TCI state is the single TCI state indicated by the second information.

13. The terminal of claim 11, wherein the RRC message further includes third information on an active TCI state identifier for the target cell, and the first TCI state corresponds to the active TCI state identifier.

14. The terminal of claim 11, wherein the second information indicates a plurality of TCI states for the target cell, and the first TCI state is a TCI state for which a highest signal quality is reported in a last measurement report among the plurality of TCI states.

15. The terminal of claim 11, wherein a random access procedure is performed for the base station, in case that the first TCI state is not suitable at the time of the RACH-less handover, or in case that a reception of the PDCCH based on the first TCI state fails for a duration.

16. A base station in a wireless communication system, the base station comprising:
    a transceiver; and
    a controller configured to transmit, to a terminal, via the transceiver, upon a random access channel less (RACH-less) handover, a physical downlink control channel (PDCCH) based on a first transmission configuration indicator (TCI) state among one or more TCI states, wherein a demodulation reference signal (DMRS) antenna port associated with the PDCCH is quasi co-located with a synchronization signal block (SSB) or a channel state information reference signal (CSI-RS) corresponding to the first TCI state, wherein a transmission of the PDCCH is based on a radio resource control (RRC) message including first information configuring the RACH-less handover for a target cell and second information on the one or more TCI states for the target cell.

17. The base station of claim 16, wherein the second information indicates a single TCI state for the target cell, and the first TCI state is the single TCI state indicated by the second information.

18. The base station of claim 16, wherein the RRC message further includes third information on an active TCI state identifier for the target cell, and the first TCI state corresponds to the active TCI state identifier.

19. The base station of claim 16, wherein the second information indicates a plurality of TCI states for the target cell, and the first TCI state is a TCI state for which a highest signal quality is reported in a last measurement report among the plurality of TCI states.

20. The base station of claim 16, wherein a random access procedure is performed with the terminal, in case that the first TCI state is not suitable at the time of the RACH-less handover, or in case that the transmission of the PDCCH based on the first TCI state fails for a duration.

\* \* \* \* \*